US008619631B2

(12) United States Patent
Matsuo et al.

(10) Patent No.: US 8,619,631 B2
(45) Date of Patent: Dec. 31, 2013

(54) INFORMATION COMMUNICATION SYSTEM, INFORMATION COMMUNICATION METHOD, NODE DEVICE INCLUDED IN INFORMATION COMMUNICATION SYSTEM AND RECORDING MEDIUM RECORDING INFORMATION PROCESSING PROGRAM

(75) Inventors: Hideki Matsuo, Nagoya (JP); Kentaro Ushiyama, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 657 days.

(21) Appl. No.: 12/232,648

(22) Filed: Sep. 22, 2008

(65) Prior Publication Data

US 2009/0041035 A1 Feb. 12, 2009

Related U.S. Application Data

(63) Continuation-in-part of application No. PCT/JP2007/054519, filed on Mar. 8, 2007.

(30) Foreign Application Priority Data

Mar. 30, 2006 (JP) ................................ 2006-095557

(51) Int. Cl.
 *G06F 15/177* (2006.01)
(52) U.S. Cl.
 USPC ............ 370/255; 370/389; 709/221; 709/223
(58) Field of Classification Search
 USPC .................................. 370/389, 392, 400, 401
 See application file for complete search history.

(56) References Cited

U.S. PATENT DOCUMENTS 6,701,344 B1 * 3/2004 Holt et al. ...................... 709/204
6,754,211 B1 * 6/2004 Brown .......................... 370/389

(Continued)

FOREIGN PATENT DOCUMENTS

| CN | 1681257 A | 10/2005 |
|----|-----------|---------|
| CN | 1708026 A | 12/2005 |
| JP | A 2005-159911 | 6/2005 |

OTHER PUBLICATIONS

Abe, "DHT: Distributed Hash Table—Infrastructural Technology for Pure Peer to Peer Systems," *Japan Society for Software Science and Technology*, vol. 23, No. 1, Jan. 26, 2006, pp. 1-14.

(Continued)

*Primary Examiner* — Brian O'Connor
(74) *Attorney, Agent, or Firm* — Oliff & Berridge, PLC

(57) ABSTRACT

The present invention is to provide an information communication system with its communication load of the communication network as a whole reduced.

The above problem is solved with the information communication system formed by participation of a plurality of node devices mutually connected through the communication network, wherein a node device having a memory means for memorizing an IP address indicative of the specific node device of one or more, and an node ID corresponding to the IP address, wherein in a case where the node ID of other node device (node A) is further memorized in an area of a memory means, to which a node ID corresponding to a node device (node K) of a sending source of received information belongs, and in a case where a HOP number of from the node K to the own node device is smaller than a HOP number of from the node A to the own node device, an IP address and identification information of the node K being the information sending source is memorized in the memory means in place of the IP address and the node ID of the node A memorizing the node ID.

20 Claims, 16 Drawing Sheets

(56) References Cited

U.S. PATENT DOCUMENTS

| | | | |
|---|---|---|---|
| 7,194,002 B2* | 3/2007 | Zhang et al. | 370/400 |
| 7,212,527 B2* | 5/2007 | Shah et al | 370/389 |
| 7,324,824 B2* | 1/2008 | Smith et al. | 455/456.1 |
| 7,418,454 B2* | 8/2008 | Chen et al. | 707/999.101 |
| 7,516,116 B2* | 4/2009 | Shen et al. | 707/999.002 |
| 7,525,949 B1* | 4/2009 | Rampal et al. | 370/352 |
| 7,564,792 B2* | 7/2009 | Singh et al. | 370/236 |
| 7,656,799 B2* | 2/2010 | Samuels et al. | 370/231 |
| 7,730,207 B2* | 6/2010 | Zhang et al. | 709/242 |
| 7,782,867 B2* | 8/2010 | Suzuki et al. | 370/395.31 |
| 8,072,898 B2* | 12/2011 | Viger et al. | 370/252 |
| 8,296,441 B2* | 10/2012 | Ryman | 709/227 |
| 2002/0191600 A1* | 12/2002 | Shah et al. | 370/389 |
| 2003/0026268 A1* | 2/2003 | Navas | 370/400 |
| 2003/0147386 A1* | 8/2003 | Zhang et al. | 370/390 |
| 2005/0135252 A1* | 6/2005 | Singh et al. | 370/236 |
| 2005/0136972 A1 | 6/2005 | Smith et al. | |
| 2005/0223102 A1* | 10/2005 | Zhang et al. | 709/228 |
| 2005/0243740 A1 | 11/2005 | Chen et al. | |

OTHER PUBLICATIONS

Ueda et al., "A Peer to Peer Hierarchical Internet Hosts Clustering Algorithm," *Information Processing Society of Japan*, Kenkyu Hokoku, 2004-DSM-35-11, Sep. 24, 2004, pp. 59-64.

Kimura et al., "BGP-based QoS Routing for World-Wide Overlay Networks," 2005 Nen, *The Institute of Electronics, Information and Communication Engineers*, Sogo Taikai, B-7-45, Mar. 7, 2005, p. 199.

Oka et al., "Lightweight Load Balancing for Distributed Hash Tables," *Technical Report of the Institute of Electronics, Information and Communication Engineers*, IN2003-189, Feb. 5, 2004.

Jun. 29, 2010 Office Action issued in Japanese Patent Application No. 2006-095557 (with translation).

Foreign Office Action mailed Apr. 11, 2011 in Chinese Application No. 200780010249.9 (with translation).

Nov. 2, 2012 Office Action issued in Chinese Patent Application No. 200780010249.9 (with English Translation).

Office Action issued in Chinese Patent Application No. 200780010249.9 dated May 6, 2013 (with translation).

* cited by examiner

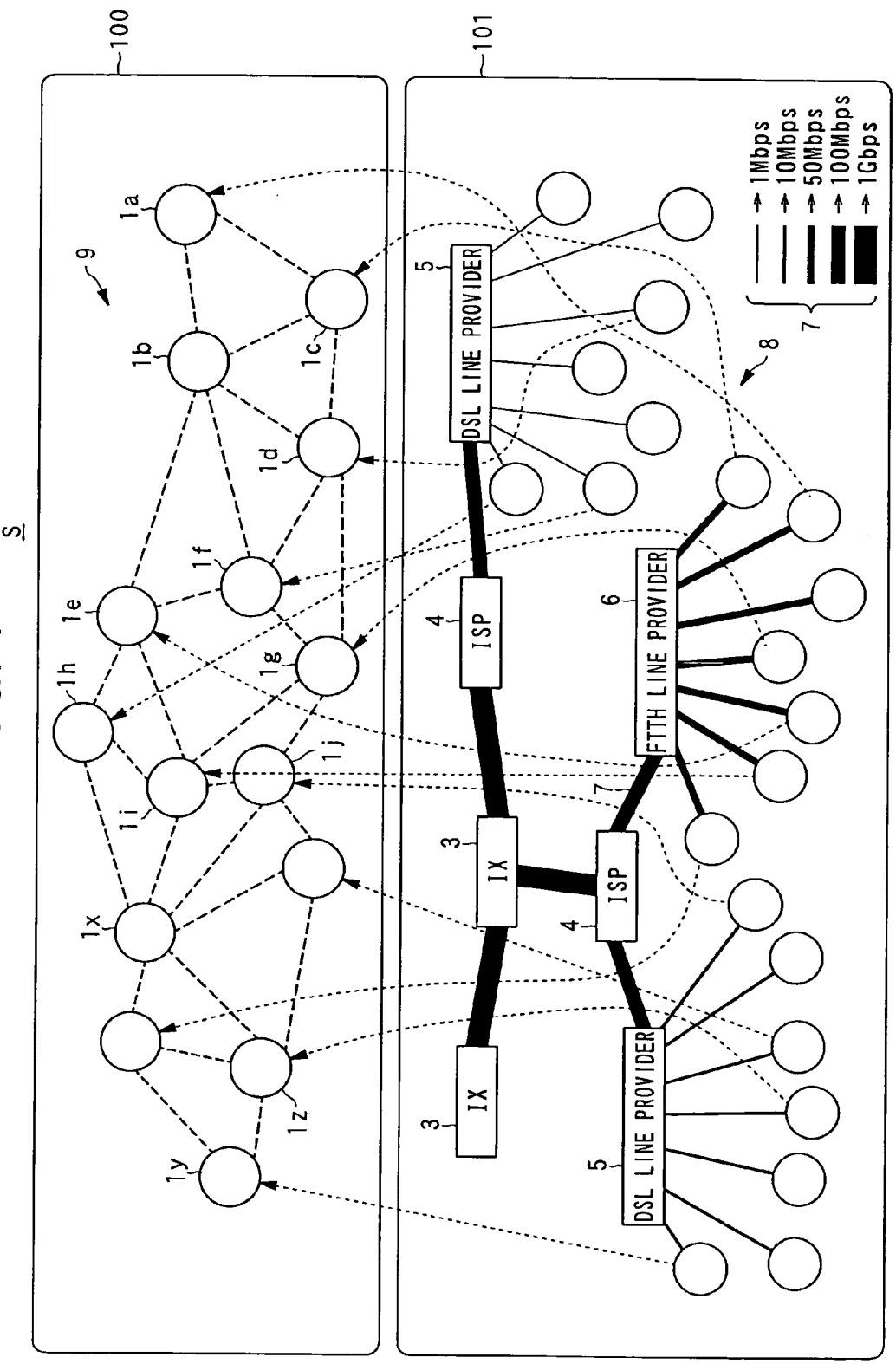

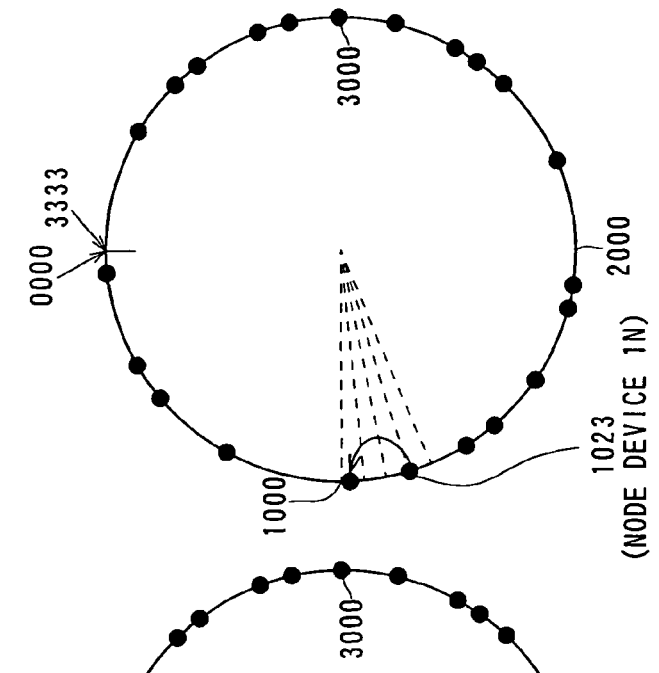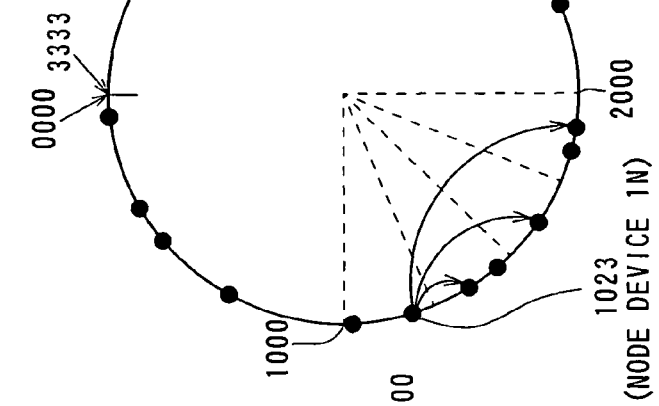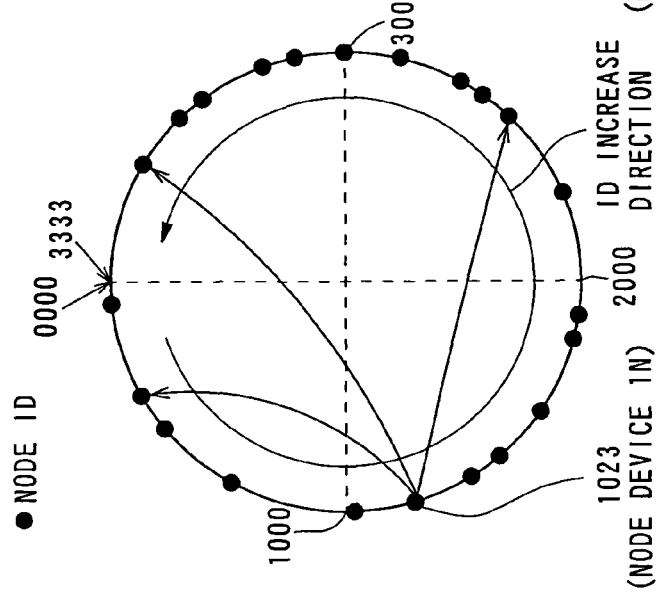

FIG. 3A

| 0130 | 1023 | 2203 | 3220 |
|---|---|---|---|
| IP ADDRESS 0 | — | IP ADDRESS 2 | IP ADDRESS 3 |

FIG. 3B

| 1023 | 1132 | 1202 | 1321 |
|---|---|---|---|
| — | IP ADDRESS 4 | IP ADDRESS 5 | IP ADDRESS 6 |

FIG. 3C

| 1000 | 1023 | — | — |
|---|---|---|---|
| IP ADDRESS 7 | — | — | — |

FIG. 3D

|  | EACH LEVEL ATTENTION DIGIT 0 | EACH LEVEL ATTENTION DIGIT 1 | EACH LEVEL ATTENTION DIGIT 2 | EACH LEVEL ATTENTION DIGIT 3 |
|---|---|---|---|---|
| LEVEL 1 | 0130 | 1023 | 2203 | 3220 |
|  | IP ADDRESS 0 | — | IP ADDRESS 2 | IP ADDRESS 3 |
| LEVEL 2 | 1023 | 1132 | 1202 | 1321 |
|  | — | IP ADDRESS 4 | IP ADDRESS 5 | IP ADDRESS 6 |
| LEVEL 3 | 1000 | — | 1023 | — |
|  | IP ADDRESS 7 | — | — | — |
| LEVEL 4 | — | — | — | 1023 |
|  | — | — | — | — |

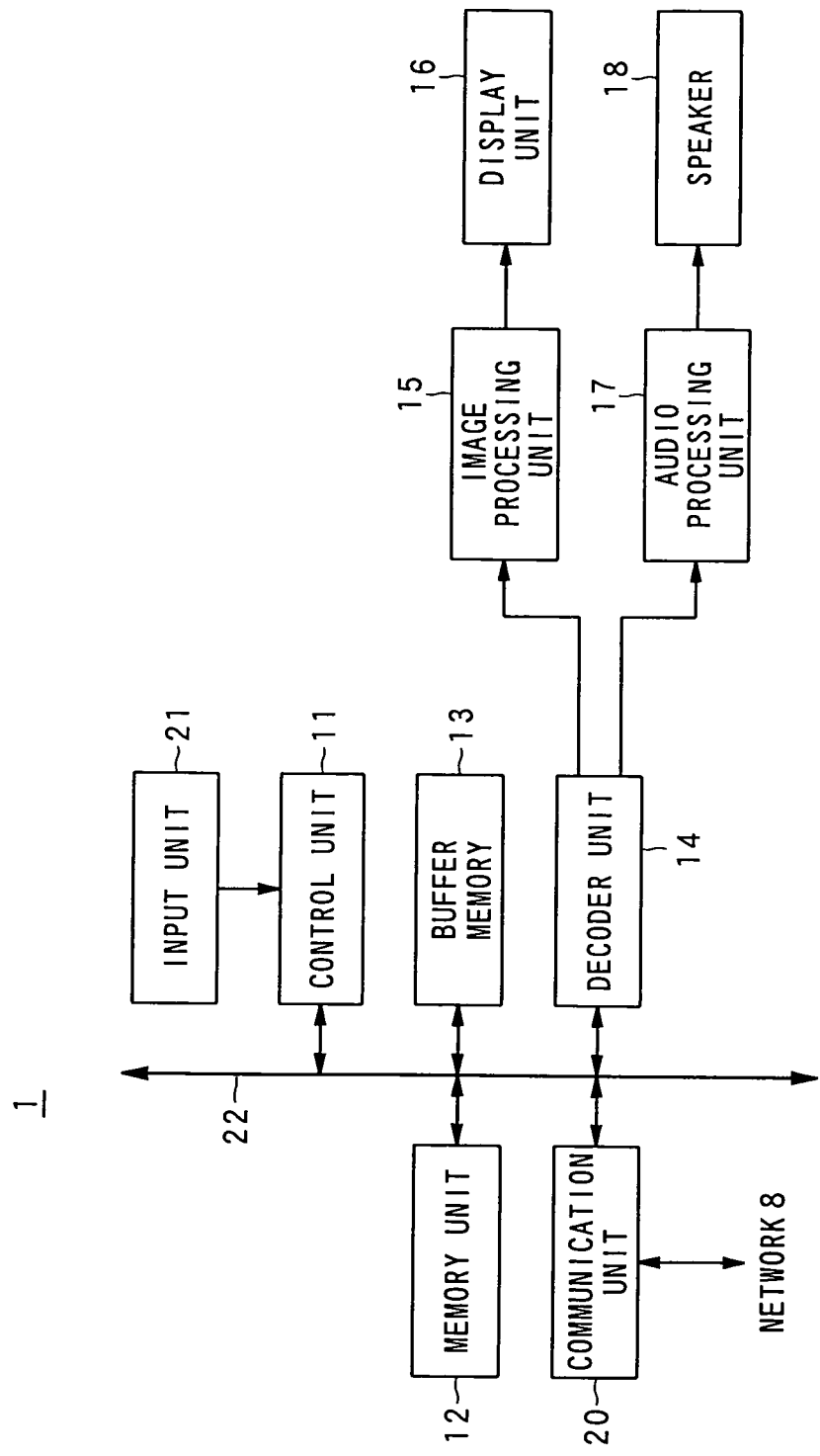

FIG. 5A

NODE Z:1013

|  | EACH LEVEL ATTENTION DIGIT X=0 | EACH LEVEL ATTENTION DIGIT X=1 | EACH LEVEL ATTENTION DIGIT X=2 | EACH LEVEL ATTENTION DIGIT X=3 |
|---|---|---|---|---|
| LEVEL 1  X*** | 0211<br>NODE A | 1013 | 2300<br>NODE B | 3121<br>NODE C |
| LEVEL 2  1X** | 1013 | — | 1221<br>NODE E | 1323<br>NODE F |
| LEVEL 3  10X* | — | NODE D | 1023<br>NODE G | 1032<br>NODE H |
| LEVEL 4  101X | BLANK | 1013 | BLANK | 1013 |
|  | BLANK | BLANK | BLANK | — |

FIG. 5B

| NODE | NODE A |
|---|---|
| NODE ID | 0211 |
| IP ADDRESS, PORT NUMBER | 112.*.*.***,23584 |
| HOP NUMBER | 4 |

FIG. 5C

| NODE K | |
|---|---|
| 0103 | |
| 223.yyy.yyy.yyy,13526 | |
| 2 | |

FIG. 5D

| NODE J | |
|---|---|
| 0331 | |
| 30.*.*.***,02451 | |
| 7 | |

FIG. 5E (see above)

FIG. 5F

| NODE L | |
|---|---|
| 1002 | |
| 142.zzz.zzz.zzz,10251 | |
| 10 | |

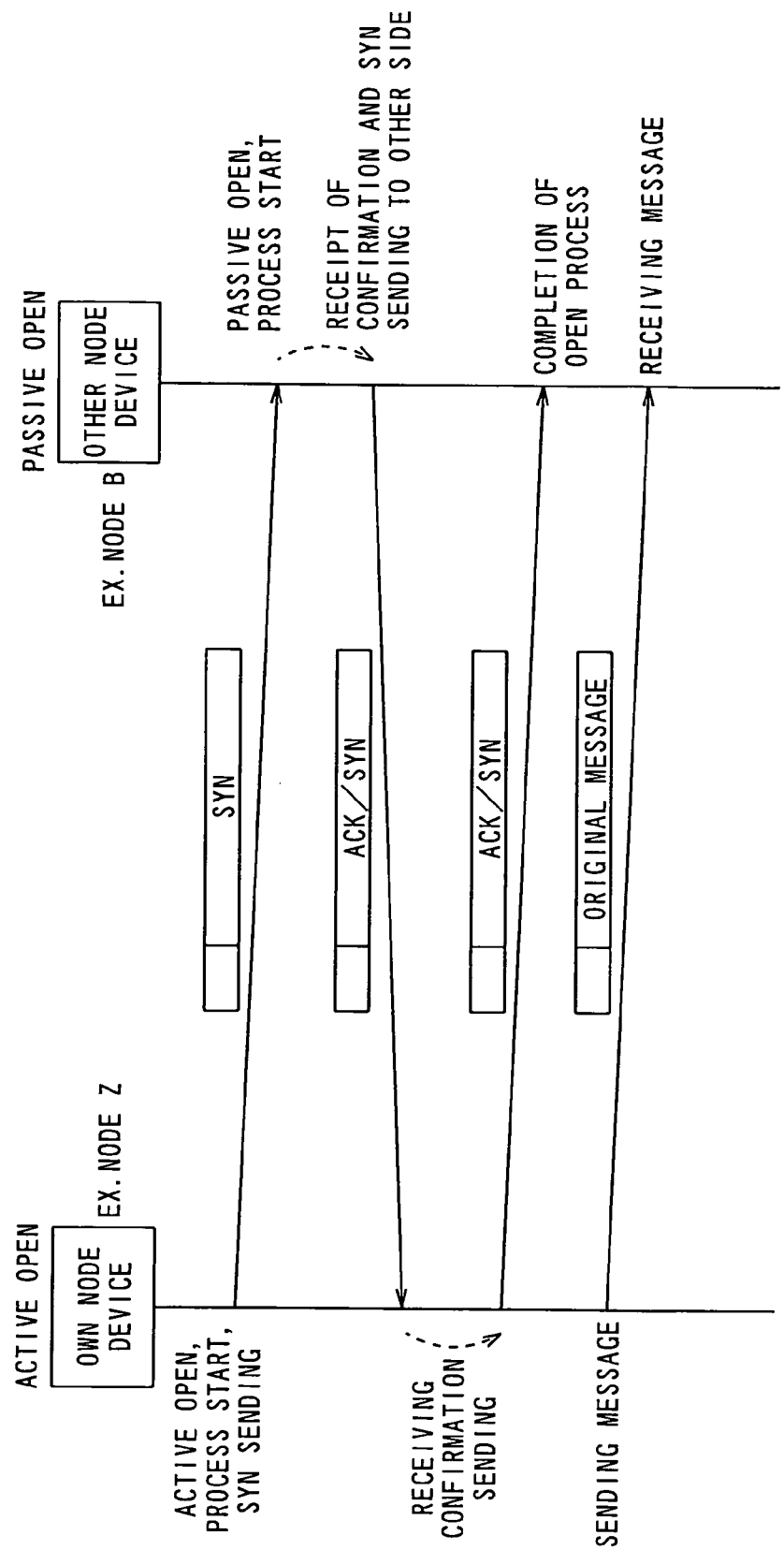

FIG.17A
NODE B:2300

|  |  | EACH LEVEL ATTENTION DIGIT X=0 | EACH LEVEL ATTENTION DIGIT X=1 | EACH LEVEL ATTENTION DIGIT X=2 | EACH LEVEL ATTENTION DIGIT X=3 |
|---|---|---|---|---|---|
| ▲ LEVEL 1 | X*** | 0211 / NODE A | 1221 / NODE E | 2300 / — | 3121 / NODE C |
| LEVEL 2 | 2X** | 2030 / NODE * | 2103 / NODE * | 2212 / NODE * | 2300 / — |
| LEVEL 3 | 23X* | 2300 / — | BLANK | 2321 / NODE * | 2333 / NODE * |
| LEVEL 4 | 230X | 2300 / — | BLANK | BLANK | BLANK |

FIG.17B
NODE E:1221

|  |  | EACH LEVEL ATTENTION DIGIT X=0 | EACH LEVEL ATTENTION DIGIT X=1 | EACH LEVEL ATTENTION DIGIT X=2 | EACH LEVEL ATTENTION DIGIT X=3 |
|---|---|---|---|---|---|
| LEVEL 1 | X*** | 0021 / NODE * | 1221 / — | 2300 / NODE B | 3201 / NODE * |
| ▲ LEVEL 2 | 1X** | 1023 / NODE G | 1120 / NODE D | 1221 / — | 1323 / NODE F |
| LEVEL 3 | 12** | BLANK | 1213 / NODE * | 1221 / — | 1230 / NODE * |
| LEVEL 4 | 122X | BLANK | 1221 / — | BLANK | BLANK |

FIG.17C
NODE G:1023
NO TRANSFER DESTINATION R ROOT NODE

|  |  | EACH LEVEL ATTENTION DIGIT X=0 | EACH LEVEL ATTENTION DIGIT X=1 | EACH LEVEL ATTENTION DIGIT X=2 | EACH LEVEL ATTENTION DIGIT X=3 |
|---|---|---|---|---|---|
| LEVEL 1 | X*** | 0131 / NODE * | 1023 / — | 2212 / NODE * | 3301 / NODE * |
| LEVEL 2 | 1X** | 1023 / — | 1133 / NODE * | 1221 / NODE E | 1311 / NODE * |
| ▲ LEVEL 3 | 10X* | BLANK | BLANK | 1023 / — | 1032 / NODE H |
| LEVEL 4 | 102X | BLANK | BLANK | BLANK | 1023 / — |

INFORMATION COMMUNICATION SYSTEM, INFORMATION COMMUNICATION METHOD, NODE DEVICE INCLUDED IN INFORMATION COMMUNICATION SYSTEM AND RECORDING MEDIUM RECORDING INFORMATION PROCESSING PROGRAM

This is a Continuation-in-Part of International Application No. PCT/JP2007/054519filed Mar. 8, 2007, which claims the benefit of Japanese Application No. 2006-095557 filed Mar. 30, 2006. The disclosure of the prior applications is hereby incorporated by reference herein in its entirety.

BACKGROUND OF THE INVENTION

1. Field of the Invention

The present invention relates to a peer-to-peer (P2P) type information communication system, method and the like including a plurality of node devices mutually connected through a network.

2. Discussion of the Related Art

An art of peer-to-peer has recently been paid attention. As to a peer-to-peer type information communication system, in an overlay network logically built using a distributed hash table (hereinafter referred to as DHT), each node device does not necessarily recognize link information (e.g. IP address) to all the node devices participating in the overlay network but retains (memorized) only link information of a portion of node devices obtained at the time of participation, and data inquiry and the like are made based on such the link information.

In such the overlay network, even in a case where participation and withdrawal (separation) of node devices are often repeated, load should be appropriately distributed. Non-patent document 1 discloses an art of an overlay network wherein load is appropriately distributed even in a case where participation and withdrawal (separation) of node devices are often repeated.

Non-Patent Document 1: "Lightweight Load Balancing for Distributed Hash Tables" Institute of Electronics, Information and Communication Engineers

SUMMARY OF THE INVENTION

A given node device registers (memorizes) link information to the other node device, participating in the overlay network, onto a routing table of DHT, and determines a node device of transfer destination of information (message) received from the other node device based on this registered information. When link information to this routing table communicates with the other node device participating in the overlay network, the link information can accumulate in a form of registering link information of the other node device or can be changed.

Specifically, a node device communicates with the other node device, and it is determined in which location in the routing table the link information is registered based on the link information of the other node device. Ordinarily, at the time of communication with the other node device, in a case where link information of the other node device is not registered in a location where the node device is to be registered, link information of the node device thus communicated is registered.

On the other hand, when it is communicated with another node device, in a case where link information of the other node device is further registered at a location where the node information should be registered, (1) link information of the node device communicating in place of the node device originally registered having its link information, (2) link information of the node device originally registered can be retained without change, or (3) it may be randomly determined whether the link information of the node device communicated with is registered again or the link information of the node device originally registered is retained without change.

However, consistently (1) in a case where link information of the communicating node device is reregistered, a routing table is changed every communication with the other node devices, there frequently occur a change of a communication route. Further, (2) in a case where link information of the originally registered node device is retained without change, since the node device participating in the network at an initial stage is registered in the routing tables of the other node devices with a high probability, the node device participating in the network frequently becomes a message transfer route, and a heavy burden is loaded on the node device. Further, (3) in a case where it is randomly determined whether the link information of a new communicating node device is registered again or the link information of the node device originally registered is retained without change, since there is no particular grounds, the above problems of either (1) or (2) may possibly occur.

The present invention is made in view of the above problems, and an object of the present invention is to provide a means for determining whether or not a given node device changes link information of the other node device registered (memorized), and an information communication system and a method for reducing communication load of the entire communication network, in a peer-to-peer type information communication system having plural node devices mutually connected through the communication network and a method thereof.

To solve the above problem, according to claim 1 of the present invention, there is provided an information communication system which is formed by participation of a plurality of node devices mutually connected through a communication network, wherein a node device included in the plurality of node devices including:

a memory means for memorizing node information indicative of one or more specific node devices and unique identification information corresponding to the node information in correspondence with each area, to which the identification information belongs;

an information receiving means for receiving information from other node devices;

a comparison means for comparing a communication load from a node device of a sending source to the own node device and a communication load from a node device memorizing the identification information to the own node device and judging a size of the communication load, in a case where the identification information of other node devices is memorized in an area of the memory means to which the identification information, corresponding to the node device being the sending source of information thus received by the information receiving means, belongs; and a memory information change means for making the node information and the identification information of the node device of the sending source memorize in the memory means in place of the node information and the identification information of the node device memorizing the identification information, in a case where the comparison means judges that the communication load from the node device of the sending source to the own node device is smaller than the communication load from the node device memorizing the identification information to the own node device.

According to this, in a case where identification information of other node device (e.g. node A) is further memorized in an area (e.g. node ID etc. corresponding to IP address) of the memory means, to which identification information corresponding to a node device (e.g. node K) of a sending source of the received information belongs, node information (e.g. IP address) and identification information of a node device having a small (e.g. small HOP number etc.) communication load with respect to the own node device among the node devices (node K) and the node devices (node A) already memorizing the identification information are memorized in the area, to which the identification information belongs.

Therefore, only when it is changed to information of node device having a smaller communication load, there occurs a change in the communication route, whereby the communication load of the communication network is stabilized. Further, when the information of the memory means is changed, information of a node device having a further smaller communication load is memorized and communication with the node device is established. Therefore, a communication load in the entire communication network is reduced and the communication network itself is further stabilized. As such, according to the above information communication system, it is possible to reduce the communication load of the entire communication network in the information communication system.

According to the present invention, a node device which has each of the above-mentioned means, particularly the comparison means and the memory information change means, can reduce information load on the entire communication network in the information communication system.

BRIEF DESCRIPTION OF THE DRAWINGS

FIG. 1 is A view showing an example of connection status of respective node devices in an information communication system related to the present embodiment.

FIG. 2 is a view showing an example of creating an ID space by DHT and a routing table.

FIG. 3A is a view showing an example of a table of level 1, FIG. 3B is an example of a table of level 2, FIG. 3C is an example of table of level 3, and FIG. 3D is an example of a completed routing table.

FIG. 4 is a view showing an example of schematic configuration of a node device 1.

FIG. 5A is an example of a routing table retained by a node Z used in the embodiment, and FIG. 5B to 5F are respectively examples showing information corresponding to registered node devices and a new node device.

FIG. 7 is a view showing a method of establishing connection in a case of using an ordinary TCP protocol.

FIG. 17A to 17C are views showing a DHT routing table memorized by the other node device 1.

DETAILED DESCRIPTION OF THE PREFERRED EMBODIMENTS

Figure 6A:
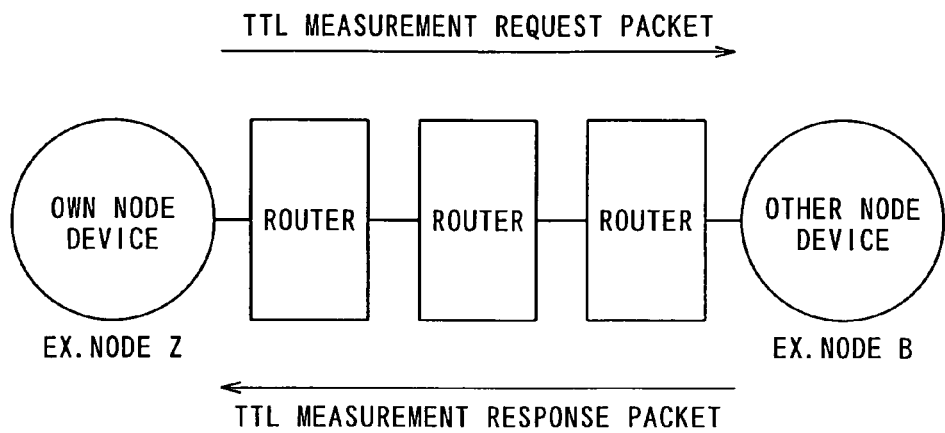
FIG. 6A is an example showing information mode of an own node device and another node device.

Hereinafter, each designation of numerical reference in the drawings is typically as follows:
1: Node device;
8: Network;
9: Overlay network;
11: Control unit;
12: Memory unit;
13: Buffer memory;
14: Decoder;
15: Image processing unit;
16: Display unit;
17: Audio processing unit;
18: Speaker;
20: Communication unit;
21: Input unit;
22: Bus; and
S: Information communication system Hereinafter, embodiments of the present invention will be described in reference of drawings. The embodiments explained below are cases where the present invention is applied to an information communication system using DHT, IP address as node information, node ID as identification information. According to the present embodiment, in the information communication system, a node device determines whether or not information change is carried out in a DHT routing table using TTL (Time To Live) as information of communication load. Here, inventions of information communication system and the like according to the present invention are not limited to the embodiments described below and can be practiced by appropriately modifying within a scope of technical concept of the present invention.

[1. Configuration and the Like of Information Communication System]

First, with reference to FIG. 1, schematic configuration and the like of an information communication system is described.

FIG. 1 is a view showing an example of connection status of respective node devices in an information communication system according to the present embodiment.

As shown in lower frame 101 in FIG. 1, a network (network in real world) 8 such as Internet is constructed by an internet exchange (IX) 3, internet service providers (ISP) 4, digital subscriber line (DSL) providers (or device thereof) 5, fiber to the home (FTTH) line provider (or device thereof) 6, and communication line (e.g. a phone line or an optical cable) 7 and the like.

The information communication system S is provided with plural node devices 1a, 1b, 1c . . . 1x, 1y, 1z . . . which are mutually connected through such the network 8, the system is a peer-to-peer type network system. A unique manufacturing number and an IP (Internet Protocol) address as information showing the node device (node information in the present invention) are allocated to each of the nodes 1a, 1b, 1c ... 1x, 1y, 1z .... Such manufacturing numbers and IP addresses do not overlap among plural node devices 1. Here in some cases, any one of the node devices 1a, 1b, 1c ... 1x, 1y, 1z ... is referred to as a node device 1 for convenience.

[1.1 Outline of DHT]

Next, algorithm using a distributed hash table (hereinafter referred to as "DHT") related to the present embodiment is described.

In the above-mentioned information communication system S, the node device 1 should know an IP address as node information with each other when they exchange information with each other.

For example, in a system in which contents are shared with each other, it is a simple method that respective node devices 1 participating in the network 8 know IP addresses of all the node devices 1 participating in the network 8. However, it is not realistic that a large number of IP addresses for all the node devices as many as tens of thousands or hundreds of thousands are memorized. Further, when arbitrary node devices turned on or turned off, operation becomes difficult because IP addresses of the arbitrary node devices memorized in the respective node devices 1 are frequently updated.

Then, there is a system invented such that one unit of node device 1 remembers (memorizes) only an IP address of a necessary minimum node device 1 among all node devices 1 participating in the network 8, and information is mutually transferred among the node devices 1 in order to deliver the information to a node device 1 not knowing (not memorizing) the IP address.

As an example of such the system, an overlay network 9 is configured by an algorithm using DHT as shown in an upper frame 100 of FIG. 1. That is, the overlay network 9 means a network configuring a virtual link formed by use of an existing network 8.

The present embodiment is provided on the premise of an overlay network 9 configured by the algorithm using DHT. The node devices 1 allocated to this overlay network 9 are referred to as node devices 1 participating in the information communication system S (i.e. participating in the overlay network 9). Here, participation into the information communication system S is done when a node device 1 not yet participating sends a participation request (also referred to as participation message hereinafter) to an arbitrary node device 1 already participating.

Node IDs (identification information) of the respective node devices 1 participating in the information communication system S provides a unique number to the respective node devices. The number must be a bit number enough for including a maximum operation number of node devices. For example, when the number is 128-bit number, the node device can operate 2^128=340×10^36 node devices.

More specifically, the node IDs of the respective node devices 1 are hash values obtained by hashing a unique value such as IP address or manufacturing number of the respective node devices by a common hash function (hash algorithm), and are distributed and located in one ID space without deviation. Such the node ID obtained (hashed) by a common hash function has very low possibility of having an identical value if the IP address or the manufacturing number differs. Here, because the hash function is well known, detailed explanation thereof is omitted. In the present embodiment, a value obtained by hashing an IP address (global IP address; node information) with a common hash function is used as a node ID (GUID (Global Unique Identifier); identification information).

[1.2 Creation of Routing Table]

Next, an example of a method of creating a routing table used in DHT is explained with reference to FIG. 2. FIG. 2 is a view showing an example of creating a routing table using DHT.

Since the node ID provided to respective node devices 1 are generated by a common hash function, they are considered to be dispersed and located in the same ring-shape ID space without much deviation as shown in FIGS. 2(A) and 2(C). The figures are provided with a node ID at 8 bits and illustrated. In the figures, a black dot indicates a node ID, and ID increases counterclockwise.

First, as shown in FIG. 2(A), the ID space is divided into several areas. Although, actually the ID space divided into about sixteen is often used, the ID space is quadrisected for easy of explanation, wherein the ID is expressed by a quaternary number of bit length of 8 bits. Then a node ID of a node device 1N is set up to be "1023", and an example of creating a routing table of this node device 1N is explained.

(Routing Level 1)

When the ID space is quadrisected, it is divided into four areas having different maximum digit, "0XXX", "1XXX", "2XXX", and "3XXX" (X being integer number of 1 to 3, similar to the above hereinafter) which are expressed by quaternary number. Since the node ID of the node device 1N itself is "1023", the node device 1N is located in the area "1XXX" in the lower left of the figure. When the node device 1N sends and receives a message to and from a node device 1 located in an area except for the area (i.e. area "1XXX") where the own node exists, IP address of the node ID is memorized in a table level 1. FIG. 3(A) is an example of the table level 1. In a second column indicating the node device 1N itself, it is not necessary to memorize the IP address.

(Routing Level 2)

Next, as shown in FIG. 2(B), the area, where the own node exists, among the areas thus quadrisected by the routing is further quadrisected into four areas "10XX", "11XX", "12XX", "13XX". Then in a manner similar to the above, when a message is sent to and received from a node device 1 existing in an area except for the area where the own exists, an IP address of the node ID is memorized in a table level 2. FIG. 3(B) is an example of the table level 2. Because a first column indicates the node device 1N itself, it is not necessary to memorized the IP address.

(Routing Level 3)

Next as shown in FIG. 2(C), the area, where the own exists, among the areas thus quadrisected by the routing is further quadrisected into four areas "100X", "101X", "102X", "103X". Then, in a manner similar to the above, when a message is sent to and received from a node device 1 existing in an area except for the area where the own exists, IP address of the node ID is memorized in a table level 1. FIG. 3(C) is an example of the table level 3. Since a third column indicates the node device 1N itself, the IP address is not necessary to be memorized, and a second column and a fourth column are blank because no node device exists in the area.

In such the way, routing tables are created up to level 4 as shown in FIG. 3(D) to thereby cover all 8-bit IDs. Blank in the table becomes conspicuous as the level increases.

As such, all node devices 1 respectively create and retain the routing table created in accordance with the above-mentioned methods. Thus, the node device 1 memorizes the IP address as node information of the other node device 1, the node ID as identification information, and the area of the node ID space as an area which the identification information belong to, in other words, respective levels and respective columns of DHT in correspondence with one another. Here, the node device corresponding to the node ID closest to the node ID of the own node device 1N is referred to as a root node, described below (node device having node ID: 1000 in FIGS. 2(C) and 3(D)).

Here, the number of levels is determined in response to the number of digit of the node ID and the number of attention digits of respective levels in FIG. 3(D) is determined in response to the number of base numbers. Specifically, in case of 16 digits hexadecimal number, ID has 64 bits and the number of alpha-numeral of attention digits in level 16 is 0 to f. In explanation of the routing table described below, a portion indicating number of attention digits in respective levels is also simply referred to as "column" or "column number".

[2. Configuration and the Like of Node Device]

Next, with reference to FIG. 4, configuration and function of a node device 1 is explained. Here, the configurations of respective node devices 1 are identical. FIG. 4 is a view showing a schematic configuration example of a node device 1.

The respective node devices 1 are configured by including, as shown in FIG. 4, a control unit 11 being a computer configured by a CPU having computing function, a RAM for work, a ROM for memorizing various data and programs, or the like; a memory unit 12 configured by an HD or the like for memorizing (storing) content data, index information, the above-mentioned DHT, program, or the like (the above-mentioned content data being not stored in some node devices 1); a buffer memory 13 for temporarily storing received content data or the like; a decoder unit 14 for decoding (stretching data and the like) encoded video data (image information) and audio data (audio information) included in the content data; an image processing unit 15 for providing a predetermined graphic process to the video data or the like thus decoded and outputting the data as video signal; a display unit 16 such as CRT or liquid crystal display for displaying image based on the video signal outputted from the image processing unit 15; an audio processing unit 17 for converting the thus decoded audio data into an analog audio signal in use of digital/analog (D/A) conversion, amplifying thus converted signal by an amplifier and outputting the same; a speaker 18 for outputting the audio signal thus outputted from the audio processing unit 17 as acoustic wave; a communication unit 20 for carrying out communication control of information with other node devices 1 via the network 8; and an input unit 21 (e.g. a keyboard, a mouse, or an operation panel) for receiving instruction from a user and providing the instruction signal corresponding to the instruction to the control unit 11, wherein the control unit 11, the memory unit 12, the buffer memory 13, the decoder 14, and the communication unit 20 are connected each other via a bus 22.

When CPU in the control 11 executes various programs memorized in the memory unit 12 or the like, the control unit 11 entirely controls the node device 1. Further, the control unit 11 carries out a content data registration process or the like according to the instruction signal from the input unit 21. The node device 1 functions as a node device for sending (transferring) information and as a node device for receiving information according to executed programs, or the like. Further, the control unit 11 of the node device 1 functions as an information receiving means, a comparison means, a memorized information change means, and a communication load information sending means of the present invention.

[3. Outline of Information Communication System]

Next, outline of the information communication system S of the present embodiment is explained with reference to FIG. 5. The information communication system S of the present embodiment determines whether or not one node device 1 changes information of the other node device 1 in the DHT routing table in use of TTL (Time to Live) or HOP number as information of communication load. In a case where the information is changed, it is carried out in such manner that communication load of the entire communication network decreases. Hereinafter, DHT routing table is also simply referred to "table". Further, memory of the node information and the identification information of the other node device is also referred to as "registration".

One node device 1 (node Z) memories, for example, a DHT routing table as shown in FIG. 5(A) in the memory unit 12. In the DHT routing table, the IP address and the port number as node information indicative of one or more specific node devices 1 (nodes A to H) and the node ID as a unique identification information corresponding to the node information are memorized in correspondence with each area which the node ID belongs to. Here, in below explanation of embodiments, although description of the port number as node information is omitted in some cases, the IP address and the port number are regularly memorized in the node device 1 in pairs, and the IP address and the port number are memorized in the node device 1 in correspondence with the node ID. Ordinarily, although the IP address is essentially memorized as node information in the node device 1, it is not always necessary to memorize the port number as node information by sharing the port number in the respective node devices 1.

According to the present embodiment, as shown by an example of information memorized in each one area in FIG. 5(B), the memory unit 12 memorizes a HOP number value in correspondence with the above-mentioned IP address or the node ID, in this table. As in FIG. 5(B), FIG. 5(C) shows information of the other node device 1 (node A) memorizing, FIG. 5(D) shows information of the node device 1 (node J) acquired by receiving messages or the like, FIG. 5(E) shows information of the node device 1 (node K) acquired by receiving messages or the like, and FIG. 5(F) shows information of the node device 1 (node L) acquired by receiving message or the like.

For example, in a case where the node Z receives information such as message from the node J shown in FIG. 5(D), the node Z compares HOP number (7) of the node J and HOP number (4) of the node A memorized in the table area (level 1, each level attention digit X=0) which the node ID [0331] of the node J belongs to, and information of the node device having the smaller HOP number (having a lighter communication load on the entire communication network, in a case of communication between the other node device and the own node device) is memorized. Here, since the HOP number of the node A is smaller than that of the node J, information of the node J is not memorized but the information of the node A is retained.

On the other hand, in a case where the node Z receives information such as message from the node K shown in FIG. 5(E), the node Z compares HOP number (2) of the node K and HOP number (4) of the node A memorized in the table area (level 1, each level attention digit X=0) which the node ID [0103] of the node K belongs to, and smaller HOP number is memorized. Here, the HOP number of the node K is smaller than that of the node A, information of the node K is memorized in stead of the node A.

Here in a case where the node Z receives information such as message from the node L shown in FIG. 5(F), information of the node L is newly memorized since other node devices are not memorized in the table area (level 3, each level attention digit X=0) which the node ID [1002] of the node L belongs to.

[3.1 Operation of Information Communication System in the Present Embodiment]

Next, operation of the information communication system S of the present embodiment will be described with reference to FIGS. 5 to 17.

[3.1.1. Operation of Entire Information Communication System]

Hereinafter, operation of the entire information communication system of the present embodiment will be explained with reference to FIGS. 5 to 10.

The system is provided on a premise of one node device 1 being referred to as a node Z and the node Z retaining the DHT routing table made of quadruple digits of tetra-decimal shown in FIG. 5(A). As shown in this table and an example of FIG. 5(B), the node Z memorizes the IP address (node information), the node ID (identification information), and the HOP number (communication load information) of nodes A to H belonging to any one of areas of levels 1 to 4 X each level attention digit X=0 to 3.

(Mode of Changing Table)

The control unit 11 of the node device 1 (node Z) receives information from other node device 1 (e.g. node device 1 (node K) shown in FIG. 5(E)). In a case where a node ID [0211] of further other node device 1 (node A) is memorized in an table area (level 1, each level attention digit=0) in the memory unit 12 to which a node ID [0103] corresponding to a node K which is a sending source of received information belongs, the control unit 11 compares the HOP number from the node K being the sending source to the own node device 1 (node Z) with the HOP number from the node A memorizing the node ID to the own node device 1 (node Z) to thereby judge a size of the HOP number.

In a case where the control unit 11 judges that the HOP number from the sending source node K to the own node device 1 (node Z) is smaller than the HOP number from the node A memorizing the node ID to the own node device 1 (node Z) (i.e. a communication load on the entire communication network is small in a case of communication with each node device), the control unit 11 changes to the IP address and the node ID of the node A memorizing the node ID to thereby cause the DHT routing table of the memory unit 12 to memorize the IP address and the node ID of the sending source node K.

On the other hand, in a case where the control unit 11 of the node device 1 (node Z) receives information from the other node device 1 (e.g. the node device 1 (node J) shown in FIG. 5(D)) and the node ID [0211] of further other node device 1 (node A) is memorized in the DHT routing table area (level 1, each level attention digit=0) in the memory unit 12 to which the node ID [0331] corresponding to the sending source node J belongs, the control unit 11 compares the HOP number from the sending source node J to the own node device 1 (node Z) using the HOP number of from the node A memorizing the node ID to the own node device 1 (node Z) to thereby judge a size of the HOP number.

In a case where the control unit 11 judges that the HOP number from the sending source node J to the own node device 1 (node Z) is larger than the HOP number from the node A memorizing the node ID to the own node device 1 (node Z) (i.e. communication load on the entire communication network is large in a case of communication with each node device), the control unit 11 retains the IP address and the node ID of the node A memorizing the node ID without a change.

In a case where the control unit 11 judges that the HOP number from the node device 1 of information sending source to the own node device 1 (node Z) is the same as the HOP number from the node device 1 (A) memorizing the node ID to the own node device 1 (Z), the control unit 11 may retain the IP address and the node ID of the node device 1 (e.g. node A) memorizing the node ID without changing them or may change at a rate of once a predetermined times or the like.

(Mode of Acquiring Information of Communication Load)

A mode where the node device 1 acquires a value or the HOP number of TTL being information of the above-mentioned communication load will be described with reference to FIGS. 6 to 10. In the present embodiment, the control unit 11 as an information receiving means of the node device 1 receives information of the value or the HOP number of TTL from the node device of information sending source.

Figure 6B:
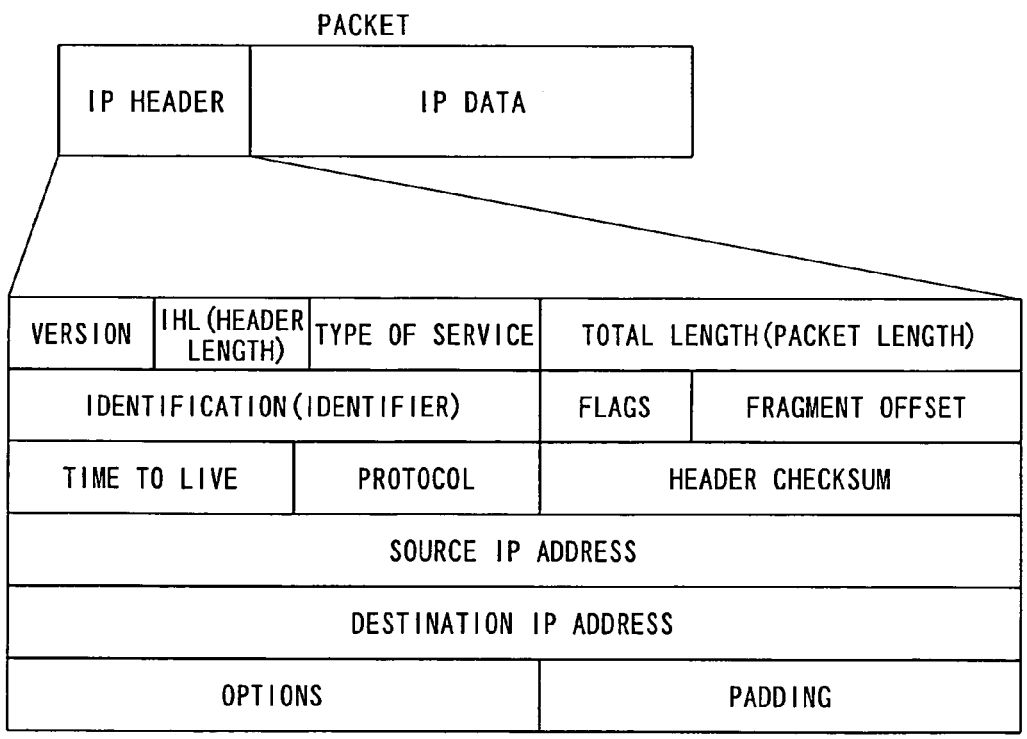
FIG. 6B is a schematic view showing a packet to be sent and received.

As shown in FIG. 6(A), the own node device 1 (e.g. node Z) communicates with the other node device 1 (e.g. node B) through one or more routers. In this communication, a packet formed of an IP header and IP data as shown in FIG. 6(B) is ordinarily sent and received. As shown in FIG. 6(B), the IP header includes information indicative of the communication load such as TTL (Time To Live: survival time).

Here, TTL is a value indicative of an effective period of the packet and a value based on the number of network connection device such as a router through which two node devices communicate with each other. TTL is expressed with an integral value up to maximum 255 and the value decreases by one every time the router or the like routes through once. When TTL of the packet becomes 0, the packet is discarded at that time, and discard notification reaches the packet sending source. TTL is a function set up to protect the packet from unlimited loop due to setting error. Although TTL originally intends to indicate life time of the packet by the second, the effective period came to be expressed by the routing frequency of the router since it is difficult to measure the lapse time actually. Although a computer of sending source can freely set TTL, when information is sent to the distant node device on the network (the node device which cannot be communicated unless routing many routers), the packet should be set up with a large value of TTL in some extent. Otherwise, TTL becomes 0 before the packet reaches a target node device, and the packet cannot reach the node device on the other side. A value subtracting TTL value in the received packet from the set value of this TTL is HOP number (TTL set value−TTL value=HOP number).

As described above, information of TTL is included in the IP header of the packet received by the node device 1. However, in an ordinary socket programming dealing with TCP protocol, the node device 1 cannot read the TTL value in a case of communication using a normal socket being an ordinary interface. Although TTL value can be read in use of a RAW socket being other interface, protocol control is required to be entirely programmed. Further by this method, labor of programmers is large. Therefore, it is preferable to use a method using the RAW socket partially only for communication as shown below.

In order to measure TTL for sending to the other node device 1 (e.g. node B) as shown in FIG. 6(A), the control unit 11 as a means for sending communication load information of the node device 1 (node Z) sends a request packet for TTL measurement at an initial stage when the communication is established, and receives a response packet for TTL measurement. The node Z can acquire TTL values from the other node device 1 (node B) to the own node device (node Z) by reading out the TTL value from signals of the response packet. Here, an initial value of TTL is predetermined, for example, 64, the maximum 255 as mentioned above.

Figure 8:
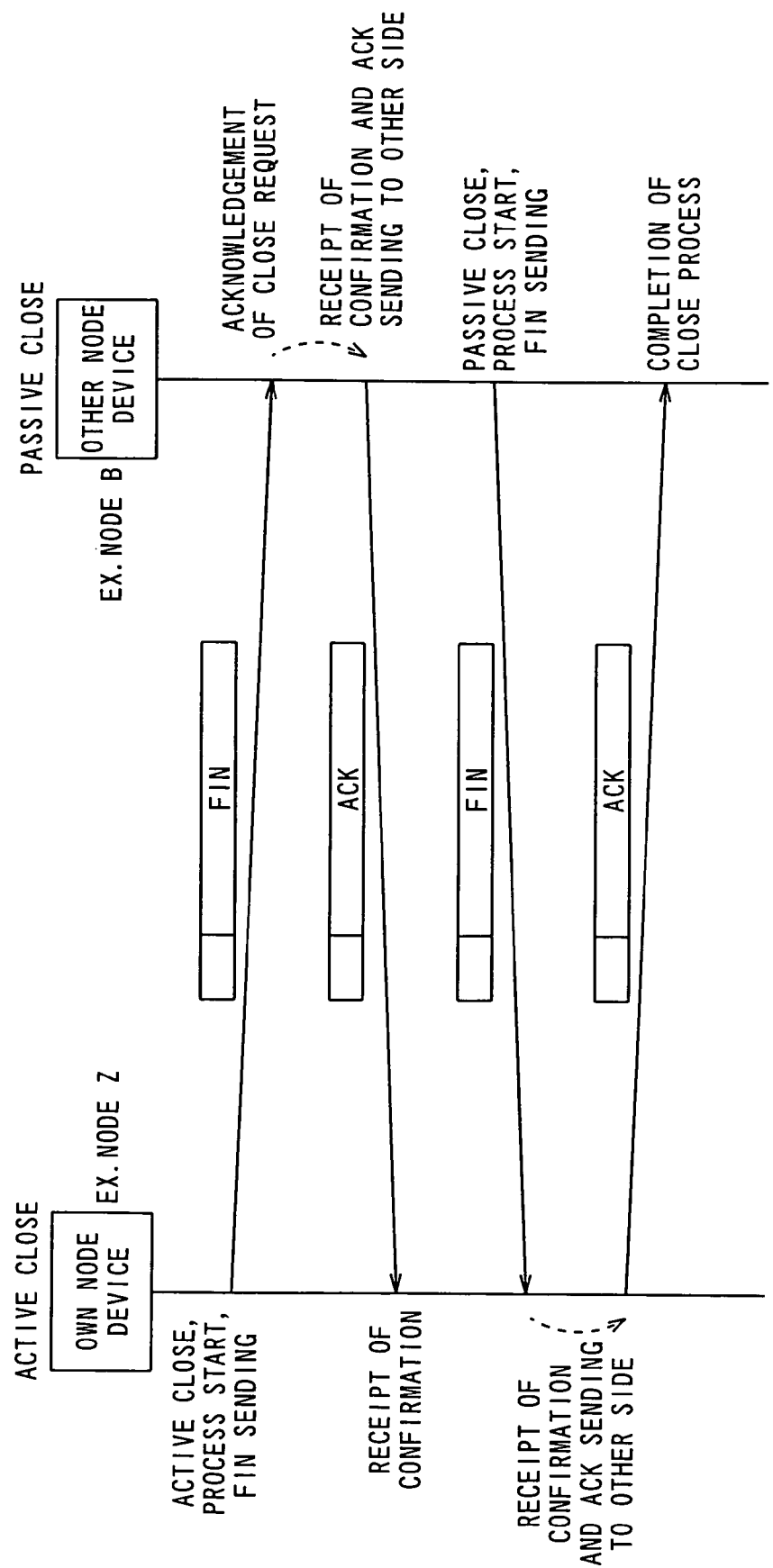
FIG. 8 is a view showing a method of cutting connection in a case of using ordinary TCP protocol.
Figure 9:
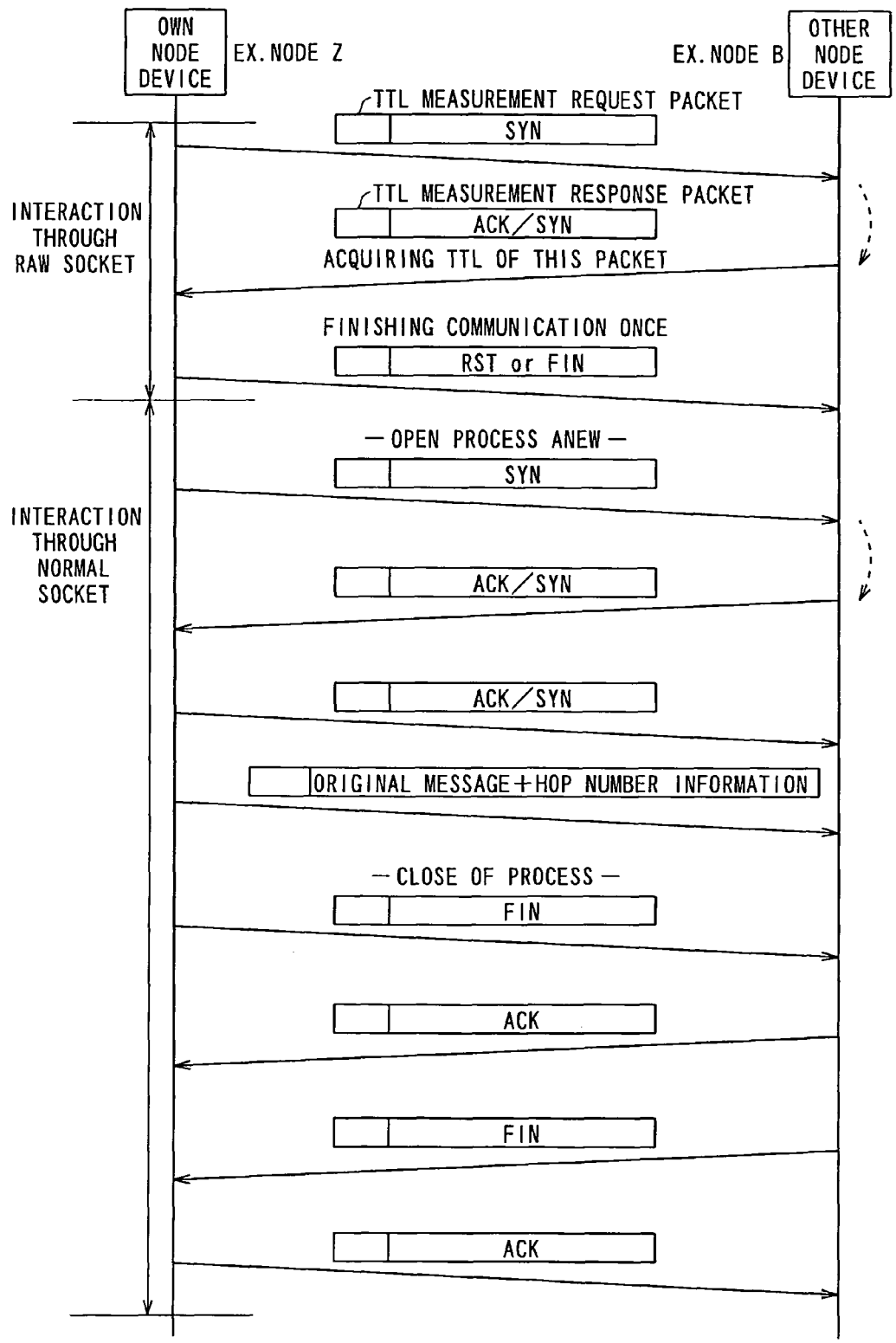
FIG. 9 is a view showing a method of measuring TTL in a case of using TCP protocol.
Figure 10:
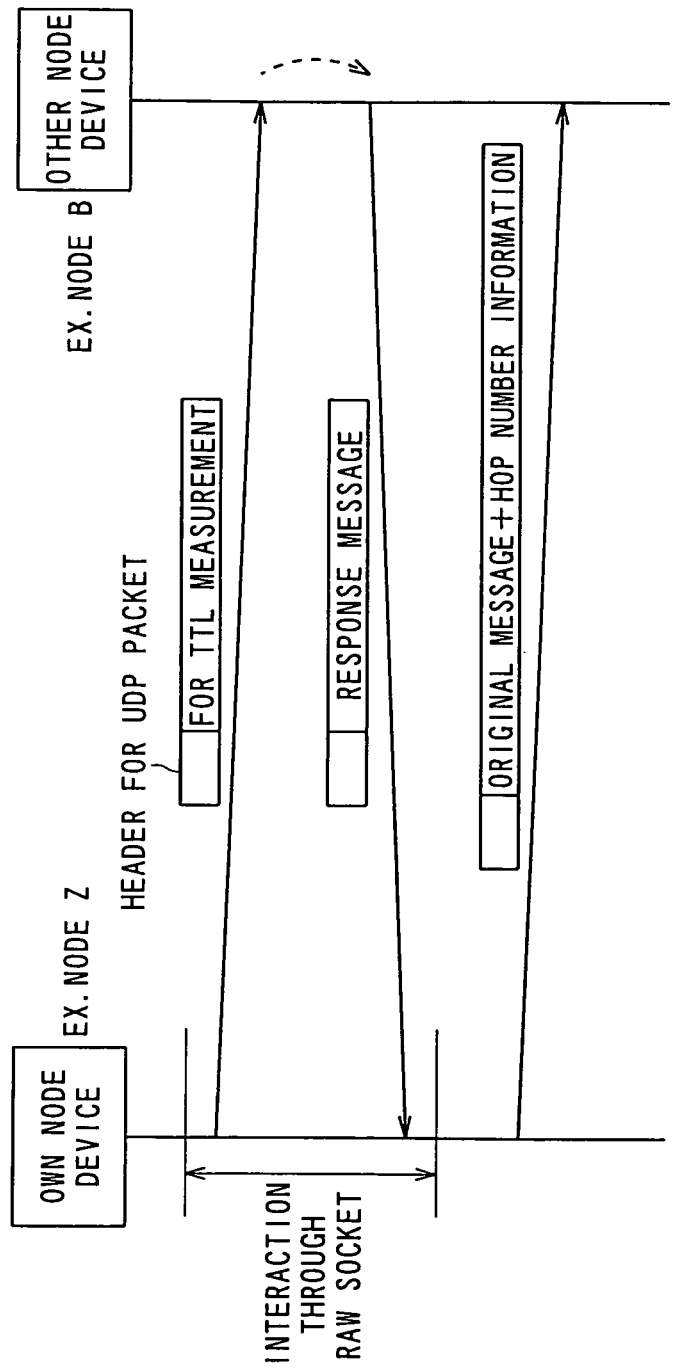
FIG. 10 is a view showing a method of measuring TTL in a case of using UDP protocol.

Here, FIG. 7 shows a connection establishment method in use of an ordinary TCP protocol. FIG. 8 shows a disconnection method in use of the ordinary TCP protocol. FIG. 9 shows a TTL measurement method in use of the TCP protocol. FIG. 10 shows a TTL measurement method in use of a UDP protocol.

As shown in FIG. 7, in the ordinary TCP protocol, first a SYN packet (signal for establishing communication) is sent to the node device 1 (node B) including the own node device 1 (node Z) to establish connection with the other node device. Receiving the SYN packet, the node B starts a passive open process to sends receipt acknowledgement (ACK) and the SYN packet to the node Z. Receiving the ACK/SYN packet, the node Z sends the receipt acknowledgement (ACK) packet to the node B to complete the open process, and then a primary message (information) is sent from the node Z to the node B.

Further, as shown in FIG. 8, in the ordinary TCP protocol, upon completion of the send of primary message (information) from the node Z to the node B, connection with other node devices is cut. Therefore, first the own node device 1 (node Z) sends a FIN packet to the node device (node B) which the own node device 1 (node Z) has communicated with until then. Receiving the FIN packet, the node B accepts a closed request and sends the receipt acknowledgement (ACK) packet to the node Z. Further, the node B sends the FIN packet to the node Z. Receiving the FIN packet, the node Z accepts a closed request and sends the receipt acknowledgement (ACK) packet to the node B.

Here, the TTL value is information (or signal) which is included in the IP header portion of the packet as shown in FIG. 6(B), and the TTL value cannot be recognized by each node device 1 in a procedure using a normal socket being an ordinary interface in TCP socket programming. Therefore, it is preferable to use a RAW socket being another interface for acquiring the TTL value.

As in a TTL measurement method using TCP protocol shown in FIG. 9, the own node device 1 (node Z) sends a SYN packet to the other node device 1 (node B) using the RAW socket. The node B receiving the SYN packet sends an ACK/SYN packet to the node Z. The node Z can acquire TTL in the ACK/SYN packet by receiving the ACK/SYN packet using the RAW socket. Thus since the node Z is enabled to acquire TTL before establishing connection with the node B, the node Z sends the RST packet or the FIN packet instead of the ACK packet as shown in FIG. 7 and finishes the communication using the RAW socket. Subsequently, the node Z reads signals corresponding to the TTL value in thus received ACK/SYN packet (signal including signal corresponding to the TTL value information) to acquire the TTL value information. Further, the node Z calculates HOP number based on the TTL value. Then the node Z adds HOP number information thus acquired from the ACK/SYN packet to the primary message and sends to the node B, using the normal socket. Subsequent open process, message sending process, and close process in FIG. 9 are similar to the explanation with reference to FIGS. 7 and 8. Thus the node B can acquire communication load information (HOP number) from the own node device 1 (node B) to the node Z being the other node device 1.

Further, as shown in a TTL measurement method using a UDP protocol in FIG. 10, it is also possible that the own node device 1 (node Z) makes up a UDP packet formed of a packet header and a message portion and sends it to the other node device 1 (node B) as a message for TTL measurement added with the header of the UDP package. At this time, the own node device 1 sends the UDP packet using the RAW socket. The node B thus receiving the UDP packet sends a response message to the node Z. The node Z receives the response message using the RAW socket to acquire TTL in the response message. Subsequently, the node Z adds HOP number information calculated based on the TTL value to the primary message and sends it to the node B using the normal socket. Accordingly, the node B can acquire communication load information (HOP number) from the own node device 1 (node B) to the node Z being the other node device 1.

According to the present embodiment, as shown in FIGS. 5(A) and 5(C), in a case where a given node device 1 (node Z) receives information from the other node device 1 (e.g. node A) and memorizes information of the node device in the DHT routing table, thus received HOP number information is memorized as communication load information together with IP address, port number, and node ID of the node device.

[3.1.2. Operation of Node Device]

Next, in a case where information of the other node device 1 (e.g. the above-mentioned node A) is already memorized in the area in the DHT routing table after one node device 1 (the above-mentioned node Z) participated in the communication network in the information communication system S, a process of determining whether or not further information is received from the other node device 1 (e.g. the above-mentioned node J, node K) belonging to the same area and rewrites information of the node A thus received will be described with reference to flowcharts of FIGS. 11 to 15.

Here the explanation using these flowcharts includes a process where the node Z receives a response message (return information) from the other node device after participating in the communication network, and a DHT routing table is created based on information of the node device of the response message sending source. Before explanation of the flowcharts, a process creating this DHT routing table is outlined with reference to FIGS. 16 and 17.

(0) Mode of Creating DHT Routing Table after Participation

Figure 16:
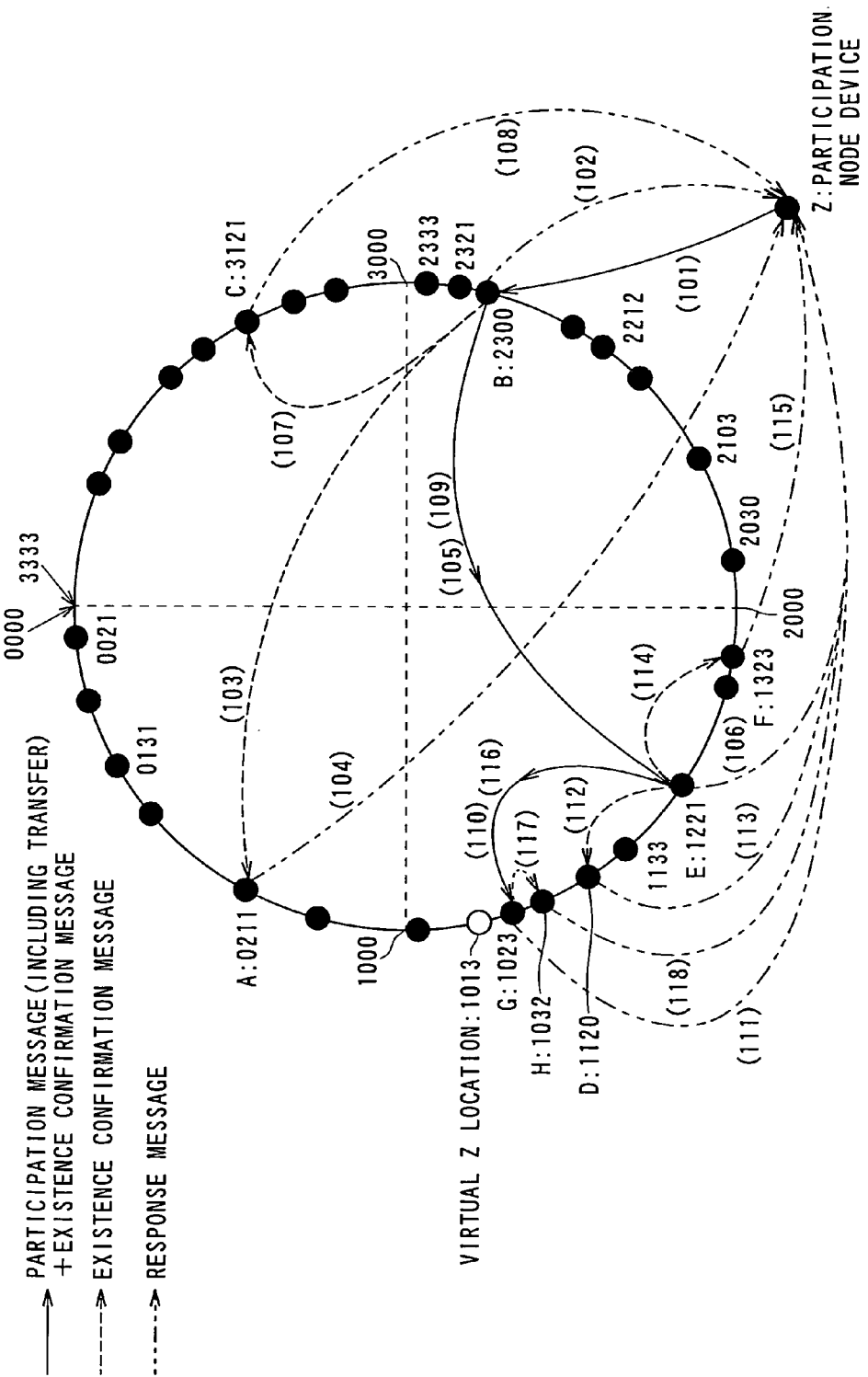
FIG. 16 is a view showing a state where a DHT routing table is created after the node device 1 participates in a communication network.

As shown in FIG. 16, when participating in the communication network in the information system S, the node Z sends a participation message to the node B being a contact node (arbitrary node device having already known IP address) (arrow mark 101). Then the node B sends a response message as return information to the node Z (arrow mark 102). Next, the node B sends an existence confirmation message as an existence confirmation information sequentially to node A, node E, and node C which are registered in the level 1 as shown in FIG. 17(A) (arrow marks 103, 105, 107). Then, the node A sends a response message to the node Z (arrow mark 104), the node E sends a response message to the node Z (arrow mark 106), and the node C sends a response message to the node Z (arrow mark 108). Here, a triangle mark on the left of level number in FIGS. 17(A) to (C) means that the existence confirmation message is sent to the node device registered in the level, the node device circled by double squares means that a participation message is transferred to the node device.

Then the node B transfers the participation message toward a root node of the node Z, the node E in this case (arrow mark 109). Here, information that a sending destination of the existence confirmation message is next level 2 is added to the participation message. Next, the node E sends the existence confirmation message sequentially to node G, node D, and node F which are registered in the next level 2 (arrow marks 110, 112, 114). Then the node G sends a response message to the node Z (arrow mark 111), the node D sends a response message to the node Z (arrow mark 113), and the node F sends a response message to the node Z (arrow mark 115).

Then, the node E transfers the participation message to the root node of the node Z, node G in this case (arrow mark 116). Here, information that a sending destination of the existence confirmation message is next level 3 is added to the participation message. Next, the node G sends the existence confirmation message to the node H which is registered in the next level 3 (arrow mark 117). Then, the node H sends a response message to the node Z (arrow mark 118). Here, since the node G is a root node of the node Z and there is no more transfer destination, the process is finished.

(1) Basic Process of Node Device

Figure 11:
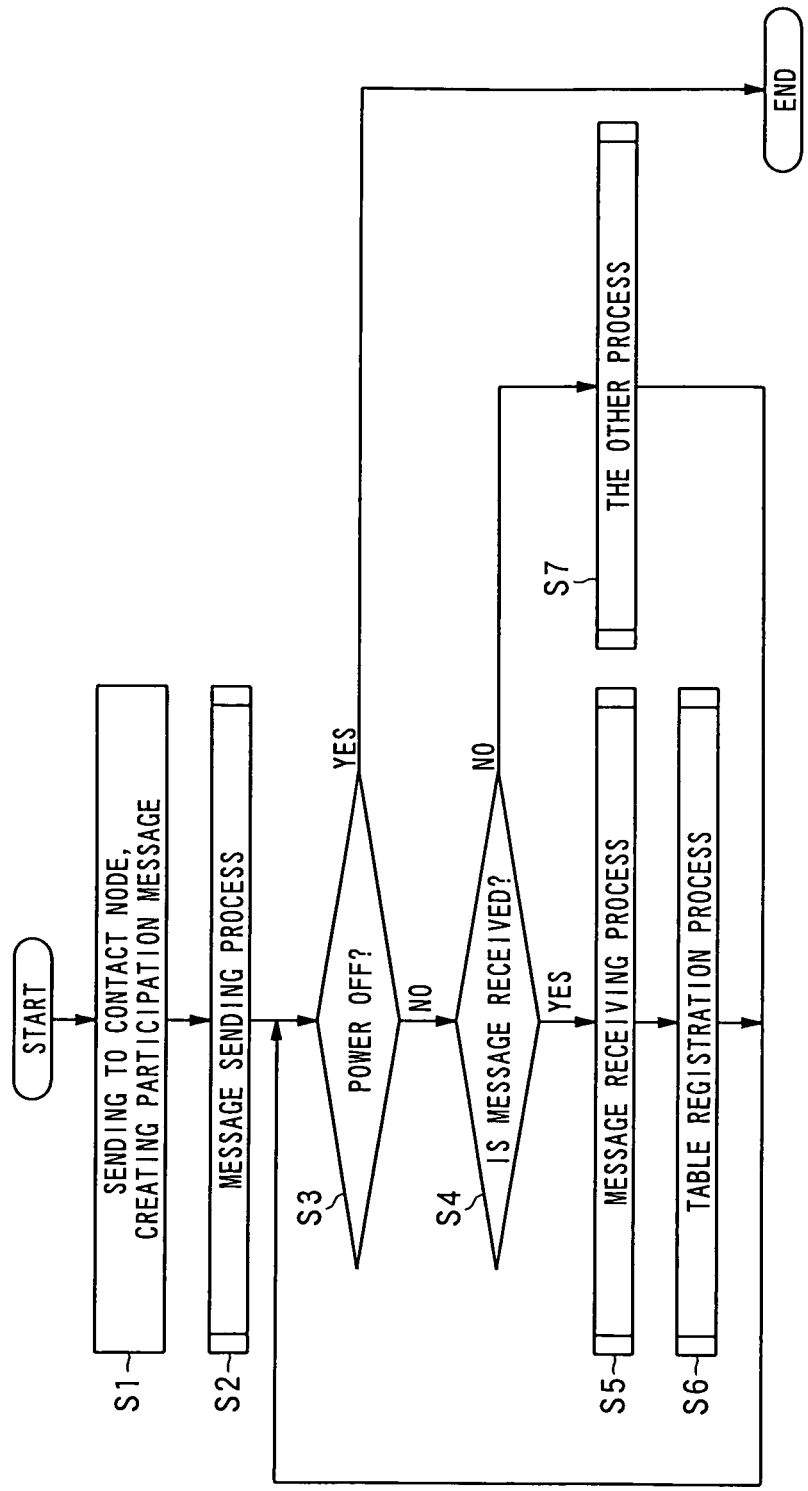
FIG. 11 is a flowchart showing a basic process in a node device 1.

Back to the flowcharts, a basic process of the node device 1 (node Z) is explained with reference to FIG. 11. The node Z creates and retains (memorizes) a DHT routing table shown in FIG. 5(A) according to the procedure shown in FIG. 16 after participating in a communication network.

When a control unit 11 of the node Z recognizes that the own node device is powered in by an input unit 21 or the like, various settings of the node Z are initialized and starts the basic process (Start). The embodiment is on the premise that the node Z retains an IP address and a port number of a contact node device 1 (node B) which the node Z first communicates with when the node Z participates in the communication network.

When the basic process stats, the control unit 11 creates a packet of participation message which is sent to the contact node (node B) (Step S1).

Next, the control unit 11 carries out a message sending process with respect to a packet of participation message thus created (Step S2). Here, the message sending process is described later with reference to FIG. 12.

Next, the control unit 11 judges whether or not the power supply is cut (Step S3), judges that the power is not cut supply since usually the power is not cut immediately after the power is turned on (Step S3; NO), and judges whether or not a message (information) is received from other node device 1 (Step S4). This time, since a response message is received at least from a node B, the control unit 11 judges that the message is received from the other node device 1 (node B) (Step S4; YES) and carries out the message receiving process (Step S5). Here, the message receiving process is described later with reference to FIG. 13.

Next, the control unit 11 registers the node device 1 (node B) of a sending source of the received message in the table (Step S6). The registration process to this table is described later with reference to FIG. 14. This time, information of the node B is registered in level 1 and area of each level attention digit X=2 in the table of the node Z (Refer to FIG. 5(A)).

Next, the control unit 11 returns to Step S3. In a case where the power is not turned off (Step S3; NO) and the message is not received (Step S4; NO), the control unit 11 carries out the other process responsive to input from the input unit 21 (Step S7) or the like and returns to Step S3. The control unit 11 of the node Z repeats operations of Steps S3 to S6 or Steps S3, S4 and S7 responsive to cases. In a case where the power of the node Z is turned off, the control unit 11 judges so (Step S3; YES) and finishes the basic process (End).

(2) Message Sending Process of the Node Device

Figure 12:
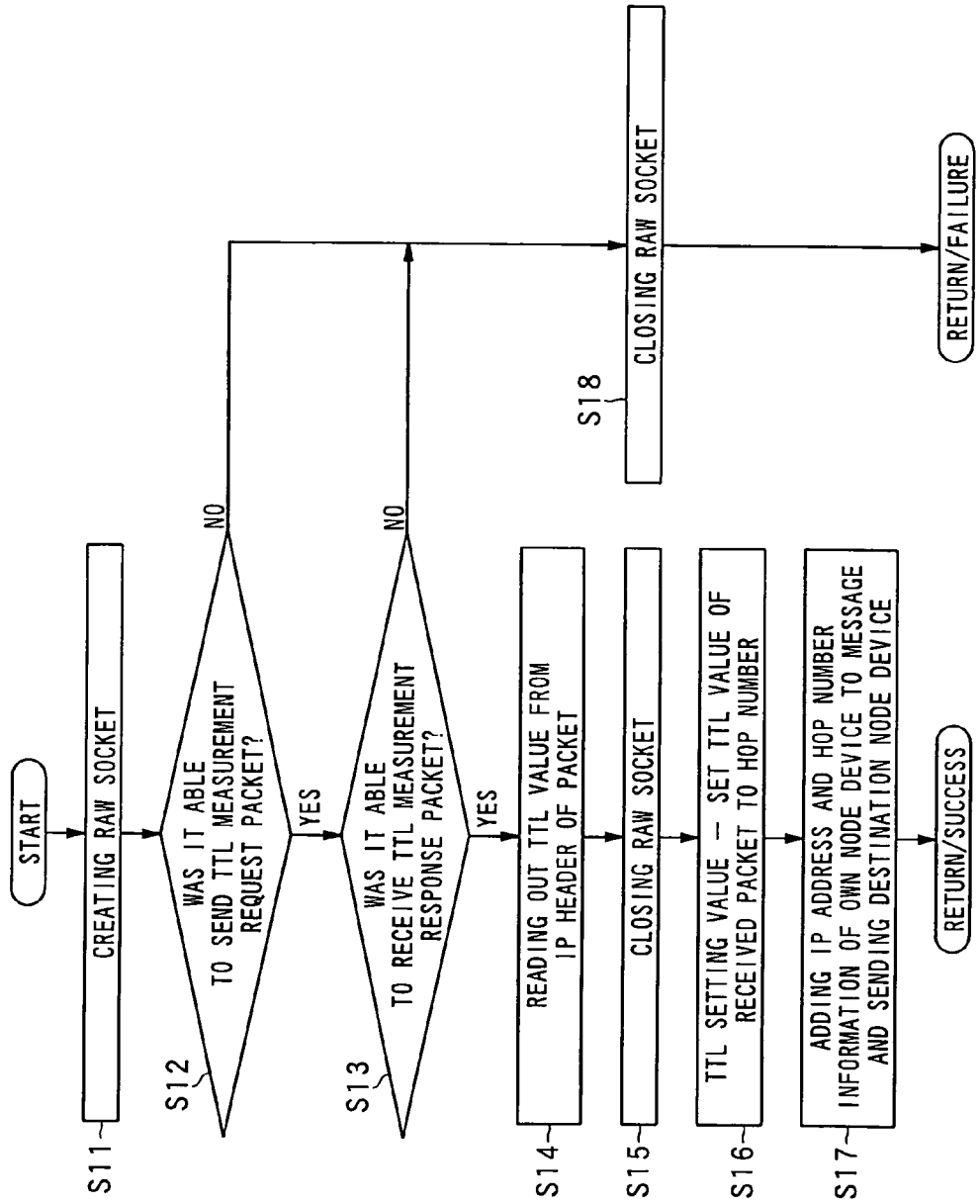
FIG. 12 is a flowchart showing a process of sending a message in the node device 1.

With reference to FIG. 12 and FIG. 9 as mentioned above, the message sending process of the node Z is described. Here, when the node Z sends information of various messages, the node Z acquires information of TTL value using a RAW socket at an initial stage and then sends information having HOP number information added using the normal socket.

When the message sending process in the above-mentioned basic process starts (Step S2), the control unit 11 of the node Z starts this message sending process (Start). The embodiment is on the premise that a packet including the IP address of the node device as content and an address of the message is created.

When the message sending process starts, the control unit 11 creates the RAW socket (Step S11). Next, the control unit 11 sends a TTL measurement request packet to the message addressed node device 1 and judges whether or not the packet can be sent (Step S12). In a case where the node Z sends the packet to the node B being a contact node, ordinarily the node B exists, the packet can be sent, and therefore the control unit judges so (Step S12; YES). Next, the control unit 11 judges whether or not a TTL measurement response packet can be received from the addressed node device (Step S13).

In a case where the node Z sends the packet to the node B being a contact node, ordinarily the response packet can be received from the existing node B, and therefore the control unit 11 judges so (Step S13; YES). Next, the control unit 11 reads out information of the TTL value from the IP header of the response packet (Step S14). Here, a TTL value is assumed as 249 and a TTL set value is 255.

Next, the control unit 11 closes the RAW socket (Step S15), and the TTL value (249) of the received response packet is subtracted from the TTL set value (255), and this value (6) is set up as a HOP number (Step S16). The control unit 11 adds the IP address information of the own node device and the calculated HOP number information to the created packet, sends the packet to the predetermined addressed node device 1 (node B) with normal socket, and returns to the original process flow, to Step 3 here, as the message sending process is considered to succeed (Return/Success).

On the other hand, in a case where the message addressed node device 1 does not exist, and the TTL measurement request packet cannot be sent (Step S12; NO), or the TTL measurement response packet cannot be received (Step S13; NO), the control unit 11 closes the RAW socket (Step S18) and returns to the original process flow, Step 3, as the message sending process is considered to be failed (Return/Failure).

According to these processes, the node device 1 (node B in this case) receiving the message from the node Z can receive the HOP number information (the above-mentioned 6), and in a case where information of the node device 1 sending the message is registered in the table, the HOP number information can be memorized together.

(3) Message Receiving Process of the Node Device

A message receiving process of node Z, node B, node E, node G, and node A is described with reference to FIG. 13 and FIG. 9 as mentioned above.

(Node Z)

When a message receiving process (Step S5) in the above-mentioned basic process starts, the control unit 11 of the node Z starts this message receiving process (Start). Here, description is made on the premise that a response message from the node B is first received.

When the message receiving process starts, the control unit 11 judges whether or not the thus received message is a participation message (Step S21). Here, since the received message is the response message, the control unit 11 judges that the received message is not the participation message (Step S21; NO). Next, the control unit 11 judges whether or not the received message is an existence confirmation message (Step S22).

Here, since the received message is the response message, the control unit 11 judges that the received message is not the existence confirmation message (Step S22; NO). Next, the control unit 11 judges whether or not the received message is the response message (Step S23). Here, the control unit 11 judges that the received message is the response message (Step S23; YES) and returns to the original process flow (Return).

(Node B)

On the other hand, the message receiving process in a case where the participation message is received from the node Z participating in the communication network, in the contact node B, is described below. The node B is memorized in the table shown in FIG. 17(A).

When the control unit 11 of the node B receives the participation message and the message receiving process (Step S5) in the above-mentioned basic process starts, the control unit 11 starts this message receiving process (Start). When, in Step S21, the control unit 11 of the node B judges that the received message is the participation message (Step S21; YES), the control unit 11 judges whether or not the participation message includes the additional information indicative of a level number (Step S24). Since the packet of the participation message received from the node Z participating in the communication network does not include the additional information, the control unit 11 judges that the participation message does not include the additional information (Step S24; NO), and determines the level number in the table as 1 (Step S25). Here, there may be a mode where the participation node device (node Z) creating the participation message adds the additional information setting level number as 1 and sends the participation message. In such the case, the level number 1 in response to the additional information is determined by Step S40 described later, instead of Steps S24 and S25.

Next, the control unit 11 sends the response message to the node Z being a participation message sending source (Step S26). In Step S26, the operation as below-mentioned Steps S32, S33, and S41 is carried out. However, since probability is low that the node device 1 (node Z) of the participation sending source does not exist at this point, the response message sending is considered to succeed and the control unit 11 returns to the next Step S27.

Next, the control unit 11 determines column number (each level attention digit X) in the table as 0 (Step S27), and notices an area of level 1, attention digit X=0 in FIG. 17(A) showing the table of the node B. The control unit 11 judges whether or not thus determined column number is not larger than entire table column number (Step S28). Since the determined column number 0 is not larger than the entire table column number 3 (Step S28; YES), the control unit 11 judges whether or not the node device falling into the attention [level number] [column number] is the own node device (Step S29).

Here, since the node device falling into the attention [level number 1] [column number 0] is not the own node device as shown in FIG. 17(A), the control unit 11 judges so (Step S29; NO). Next, the control unit 11 judges whether or not information of the other node device is memorized in the attention [level number] [column number] (Step S30).

Here, since the node device having the node ID [0211] is memorized in [level number 1] [column number 0], the control unit 11 judges so (Step S30; YES), creates the existence confirmation message including the IP address of the node Z being the participation message sending source, and determines the node device (node A) having the node ID [0211] memorized in [level number 1] [column number 0] as the message sending source (Step S31). Next, a message sending process is carried out to the node A being a sending destination with respect to thus created existence confirmation message (Step S32). This message sending process is similar to the process described above using FIG. 12 and the message sending process is considered to succeed here.

Next, the control unit 11 judges whether or not the message sending process succeeds (Step S33), and in this case, since sending process of the existence confirmation message succeeds, the control unit 11 judges so (Step S33; YES). Next, the control unit 11 adds 1 to the column number 0 to make a column number 1 (Step S34) and returns to Step S28.

Next, going through Step S28; YES, Step S29; NO, Step S30; YES, Step S31, Step S32, and Step S33; YES, the control unit 11 sends the existence confirmation message to the node device (node E) having the node ID [1221] which is memorized in [level number 1] [column number 1], adds 1 to the column number 1 to make the column number 2 (Step S34) and returns to Step S28.

Next, going through Step S28; YES, the control unit 11 judges the area [level number 1] [column number 2] is the own node device in Step S29 (Step S29; YES), adds 1 to the column number 2 to make the column number 3 (Step S34), and returns to Step S28.

Next, going through Step S28; YES, Step S29; NO, Step S30; YES, Step S31, Step S32, and Step S33; YES, the control unit 11 sends the existence confirmation message to the node device (node C) having the node ID [3121] which is memorized in [level number 1] [column number 3], adds 1 to the column number 3 to make the column number 4 (Step S34), and returns to Step S28.

Here, the control unit 11 judges whether or not the determined column number is smaller than the column number of the entire table (Step S28), and since the determined column number 4 is not smaller than the column 3 of the entire table (Step S28; NO), the node device of the participation message transfer destination (sending destination) is recognized (Step S35). Here, as explained with reference to FIG. 2, since the node device closest to the node ID [1013] of the node Z being the participation node device is the node E having the node ID the node E is recognized as transfer destination of the participation message.

Next, the control unit 11 judges whether or not the own node device is the node device closest to the node ID [1013] of the root node, or the node Z being the participation node device (Step S36). As mentioned above, here, the node device closest to the node ID [1013] of the node Z being the participation node device is the node E having the node ID [1221], and the own node device is not the root node. Therefore, the control unit 11 judges so (Step S36; NO), and creates the participation message which is added with level number information adding 1 to the attention level number as the additional information (Step S37). Here, the attention level number is 1 and the control unit 11 adds the additional information of level number 2 with 1 added thereto to the participation message.

Next, the control unit 11 carries out a message sending process to the transfer destination node E with respect to thus created participation message (Step S38). This message sending process is similar to the above-mentioned process with reference to FIG. 12, and here the message sending process is considered to succeed.

Next, the control unit 11 judges whether or not the message sending process succeeds (Step S39). Here since the sending process of the existence confirmation message succeeds, the control unit 11 judges so (Step S33; YES) and returns to the original process (Return).

(Node E)

Next, in the node E, the participation message is transferred from the node B, and the message receiving process when the message is received is described below. The node E beforehand memorizes the table shown in FIG. 17(B).

When the control unit 11 of the node E receives the participation message and the message receiving process in the above-mentioned basic process starts (Step S5), the control unit 11 starts this message receiving process (Start). In Step S21, the control unit 11 of the node E judges that thus received message is the participation message (Step S21; YES), and then judges whether or not the participation message includes the additional information indicative of level number (Step S24). Since a packet of the participation message received from the node B includes the additional information indicative of level number 2, the control unit 11 judges that the participation message includes the additional information (Step S24; YES), and determines the level number in the table as level number 2 responsive to the additional information (Step S40).

Next, the control unit 11 determines the column number (each level attention digit X) in the table as 0 (Step S27) and notes the area of level 2, attention digit X=0 in FIG. 17(B), which is indicative of the table of the node E. The control unit 11 judges whether or not the determined column number is smaller than the column number of the entire table (Step S28). Since the determined column number 0 is smaller than the column number 3 of the entire table (Step S28; YES), the control unit 11 judges whether or not the node device corresponding to the attention [level number] [column number] is the own node device (Step S29).

Here, since the node device corresponding to the attention [level number 2] [column number 0] is not the own node as shown in FIG. 17(B), the control unit 11 judges so (Step S29; NO), and then judges whether or not information of the other node device is memorized in the attention [level number] [column number] (Step S30).

Here, since the node device having the node ID [1023] is memorized in [level number 2] [column number 0], the control unit 11 judges so (Step S30; YES). Then the control unit 11 creates the existence confirmation message including the IP address of the node Z being the participation message sending source, and determines the message sending source as the node device (node G) having the node ID [1023] memorized in [level number 2] [column number 0] (Step S31). Next, a message sending process to the sending destination node G is carried out with respect to thus created existence confirmation message (Step S32). This message sending process is similar to the process mentioned above with reference to FIG. 12 and, here, is considered to succeed.

Next, the control unit 11 judges whether or not the message sending process succeeds (Step S33), and here the existence confirmation message sending process succeeds, the control unit 11 judges so (Step S33; YES). Next, the control unit 11 adds 1 to the value of the column number 0 to make the column number 1 (Step S34) and returns to Step S28.

Next, the control unit 11 goes through Step S28; YES, Step S29; NO, Step 30; YES, Step S31, Step S32, and Step S33; YES, sends the existence confirmation message to the node device (node D) having the node ID [1120] memorized in [level number 2] [column number 1], adds 1 to the value of the column number 1 to make the column number 2 (Step S34), and returns to Step S28.

Next, the control unit 11 goes through Step S28; YES, judges that the area of [level number 2] [column number 2] is the own node device in Step S29 (Step S29; YES), adds 1 to the value of column number 2 to make the column number 3 (Step S34), and returns to Step S28.

Next, the control unit 11 goes through Step S28; YES, Step S29; NO, Step 30; YES, Step S31, Step S32, and Step S33; YES, sends the existence confirmation message to the node device (node F) having the node ID [1323] memorized in [level number 2] [column number 3], adds 1 to the value of the column number 3 to make the column number 4 (Step S34), and returns to Step S28.

Here, the control unit 11 judges whether or not the determined column number is smaller than the column number of the entire table (Step S28). Since the determined column number 4 is not smaller than the column number 3 of the entire table (Step S28; NO), the control unit 11 recognizes the node device of the participation message transfer destination (sending destination) (Step S35). At this time, since the node device closest to the node ID [1013] of the node Z being the participation node device is the node G having the node ID [1023], the control unit 11 recognizes the node G as the participation message transfer destination.

Next, the control unit 11 judges whether or not the own node device is the node device closest to the node ID [1013] of the node Z being the root node or the participation node device (Step S36). As mentioned above, here, since the node device closest to the node ID [1013] of the node Z being the participation node device is the node G having the node ID [1023] and the own node device is not the root node, the control unit 11 judges so (Step S36; NO), and creates the participation message which is added with information of level number which is added with 1 to the attention level number, as additional information (Step S37). Here, the attention level number is 2 and the control unit 11 adds the additional information of level number 3 which is added with 1, to the participation message.

Next, the control unit 11 carries out the message sending process to the transfer destination node G with respect to thus created participation message (Step S38). This message sending process is similar to the process mentioned above with reference to FIG. 12, and the message sending process is considered to succeed.

Next, the control unit 11 judges whether or not the message sending process succeeds (Step S39), and, here, since the existence confirmation message sending process succeeds, the control unit 11 judges so (Step S33; YES), and returns to the flow of the original process (Return).

Here, in a case where the message sending process is failed in Step S32 (<Return/Failure> in FIG. 12), the control unit 11 judges that the message sending process does not succeed in Step S33 (Step S33; NO), deletes corresponding IP address or the like from the table (Step S41), and returns to the next Step S34. Similarly, in a case where the message sending process ends in failure in Step S38, the control unit 11 judges that the message sending process does not succeed in Step S39 (Step S39; NO), deletes the corresponding IP address or the like from the table (Step S42), and returns to Step S35 where the transfer destination is recognized again.

(Node G)

Next, in the node G, the participation message is transferred from the node E, and the message receiving process when the message is received is described below. The node G is assumed to memorize the table shown in FIG. 17(C).

When the control unit 11 of the node G receives the participation message and the message receiving process in the above-mentioned basic process starts (Step S5), the control unit 11 starts this message receiving process (Start). In Step S21, the control unit 11 of the node G judges that thus received message is the participation message (Step S21; YES), and then judges whether or not the participation message includes the additional information indicative of level number (Step S24). Since a packet of the participation message received from the node E includes the additional information indicative of level number 3, the control unit 11 judges that the participation message includes the additional information (Step S24; YES), and determines the level number in the table as level number 3 responsive to the additional information (Step S40).

Next, the control unit 11 determines the column number (each level attention digit X) in the table as 0 (Step S27) and notes the area of level 3, attention digit X=0 in FIG. 17(C), which is indicative of the table of the node G. The control unit 11 judges whether or not the determined column number is smaller than the column number of the entire table (Step S28). Since the determined column number 0 is smaller than the column number 3 of the entire table (Step S28; YES), the control unit 11 judges whether or not the node device corresponding to the attention [level number] [column number] is the own node device (Step S29).

Here, since the node device corresponding to the attention [level number 3] [column number 0] is not the own node device as shown in FIG. 17(C), the control unit 11 judges so (Step S29; NO), and then judges whether or not information of the other node device is memorized in the attention [level number] [column number] (Step S30).

Here, since the other node device is not memorized in [level number 3] [column number 0], the control unit 11 judges so (Step S30; NO), skips this area, adds 1 to the value of the column number 0 to make the column number 1 (Step S34), and returns to Step S28.

Next, the control unit 11 goes through Step S28; YES, Step S29; NO, and Step 30; NO, and since the other node device is not memorized in [level number 3] [column number 1], skips this area, adds 1 to the value of the column number 1 to make the column number 2 (Step S34), and returns to Step S28.

Next, the control unit 11 goes through Step S28; YES, judges that the area of [level number 2] [column number 2] is the own node device in Step S29 (Step S29; YES), adds 1 to the value of the column number 2 to make the column number 3 (Step S34), and returns to Step S28.

Next, the control unit 11 goes through Step S28; YES, Step S29; NO, Step S30; YES, Step S31, Step S32, and Step S33; YES, sends the existence confirmation message to the node device (node H) having the node ID [1032] memorized in the [level number 2] [column number 3], adds 1 to the value of the column number 3 to make the column number 4 (Step S34), and returns to Step S28.

Here, the control unit 11 judges whether or not the determined column number is smaller than the column number of the entire table (Step S28), and since the determined column number 4 is not smaller than the column number 3 of the entire table (Step S28; NO), the control unit 11 recognizes the node device of the participation message transfer destination (sending destination) (Step S35). At this time, since the node device closest to the node ID [1013] of the node Z being the participation node device is the own node device (node G) having the node ID [1023], the control unit 11 recognizes the node G as the participation message transfer destination.

Next, the control unit 11 judges whether or not the own node device is the node device closest to the node ID [1013] of the node Z being the root node or the participation node device (Step S36). As mentioned above, here, since the own node device (node G) is the root node, the control unit 11 judges so (Step S36; YES), and returns to the flow of the original process (Return).

Thus, the existence confirmation message sending process for creating the DHT routing table of the node Z being the participation node device and the participation message transfer process are finished.

(Node A)

Meanwhile, the message receiving process when the node A receives the existence confirmation message sent from the contact node B is described below.

When the control unit 11 of the node A receives the existence confirmation message and the message receiving process in the above-mentioned basic process starts (Step S5), the control unit 11 starts this message receiving process (Start). Here, the explanation is given on the premise that the existence confirmation message is received from the node B.

When the message receiving process starts, the control unit 11 judges whether or not thus received message is the participation message (Step S21). Here, since the received message is the existence confirmation message, the control unit 11 judges that the received message is not the participation message (Step S21; NO), and then judges whether or not the received message is the existence confirmation message (Step S22).

The control unit 11 judges that the received message is the existence confirmation message (Step S22; YES), obtains the IP address of the node Z being the sending source of the participation message which is added to the existence confirmation message, and creates the response message sent to the node Z (Step S43). Next, the message sending process to the sending destination node Z is carried out with respect to thus created response message (Step S44). This message sending process is similar to the process mentioned above with reference to FIG. 12 and is considered to succeed.

Next, the control unit 11 judges whether or not the message sending process succeeds (Step S45), and since the existence confirmation message sending process succeeds, the control unit 11 judges so (Step S45; YES), and returns to the flow of the original process (Return).

Here, in a case where the message sending process ends in failure in Step S44 (<Return/Failure> in FIG. 12), the control unit 11 judges that the message sending process does not succeed in Step S45 (Step S45; NO), deletes corresponding IP address or the like from the table (Step S46), and returns to a flow of the original process (Return).

Besides, in a case where the message received by the node device 1 is not either of the participation message, the existence confirmation message, and the response message, the control unit 11 judges as Step S21; NO, Step S22; NO, and Step S23; NO, carries out the process for the case of receiving the other message (Step S47), and returns to a flow of the original process (Return).

(4) Process of Registering New Node Device in Table in Node Device

Figure 14:
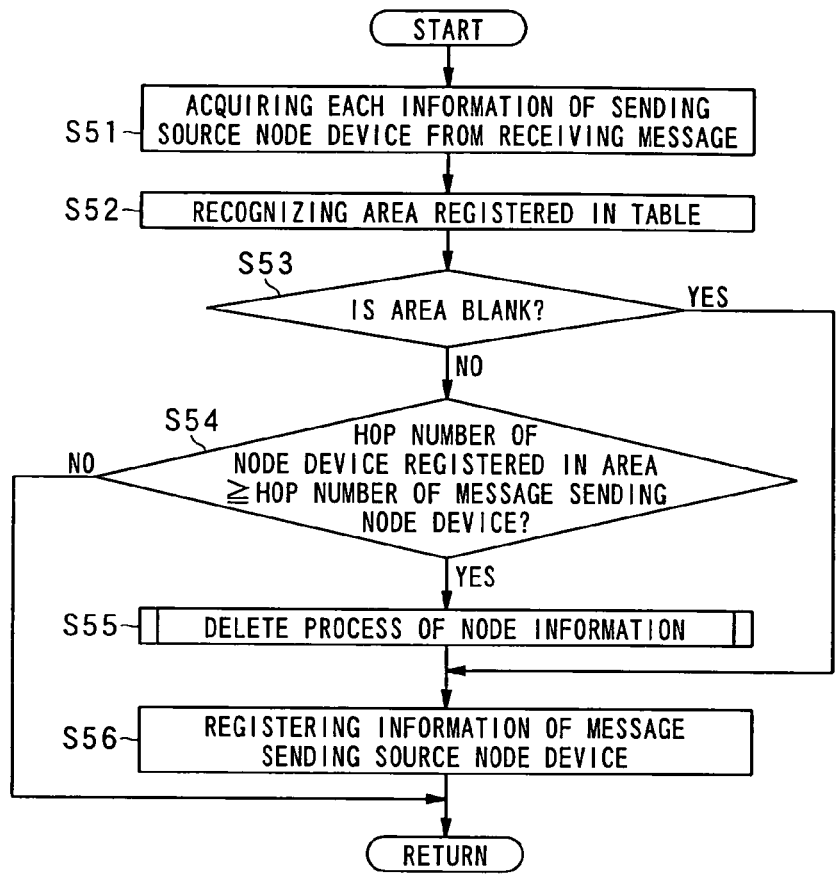
FIG. 14 is a flowchart showing a process of registering in a table of another node device 1.

The registration process of the new node device in the node Z will be described with reference to FIG. 14 and FIG. 5 as mentioned above. Here the registration process of the new node device is explained under the assumption that the node Z receives a message from the node J and subsequently from the node K and the node L.

When the registration process of the new node device in the above-mentioned basic process starts (Step S6), the control unit 11 of the node Z starts this table registration process (Start). Here, explanation is based on the assumption that the message is received from the node J.

When the table registration process starts, the control unit 11 acquires each information, specifically information such as IP address and HOP number of the node J being the sending source node device, from the received message (Step S51). Next, the control unit 11 recognizes the area to be registered in the table from acquired IP address (Step S52). Since the node J is the node ID [0331] as shown in FIG. 5(D), the area to be registered is level 1, each level attention digit X=0.

Next, the control unit 11 judges whether or not the area of this level 1, each level attention digit X=0 is blank (Step S53). Here, since information of the node A is registered in the area as shown in FIG. 5(A), the control unit 11 judges the area is not blank (Step S53; NO), and judges whether or not the HOP number of the node A registered in the area is larger than HOP number of the message sending source node J (Step S54). Here, since the HOP number (4) of the node A is not larger than the HOP number (7) of the node J, the control unit 11 judges so (Step S54; NO), and returns to a flow of the original process (Return).

Next, below explanation is made under assumption that the node Z receives the message from the node K. When the registration process of the new node device in the above basic process starts (Step S6), the control unit 11 of the node Z starts the table registration process (Start).

When the table registration process starts, the control unit 11 acquires each information of the node K being the sending source node device, specifically information such as IP address and HOP number, from the received message (Step S51). Next, the control unit 11 recognizes the area to be registered in the table from the acquired IP address (Step S52). The node K, since the node ID is 0103 as shown in FIG. 5(E), the area to be registered is level 1, each level attention digit X=0 in FIG. 5(A).

Next, the control unit 11 judges whether or not the area of each level attention digit X=0 is blank (Step S53). Here, since information of the node A is registered in the area as shown in FIG. 5(A), the control unit 11 judges that the area is not blank (Step S53; NO), and judges whether or not the HOP number of the node A registered in the area is larger than the HOP number of the message sending source node K (Step S54). At this time, since the HOP number (4) of the node A is larger than the HOP number (2) of the node K, the control unit 11 judges so (Step S54; YES), deletes information of the registered node A, registers information of the message sending source node K, and returns to a flow of the original process (Return).

Next, explanation is made below under assumption that the node Z receives the message from the node device 1 of the node L. When the registration process of the new node device in the above-mentioned basic process (Step S6) starts, the control unit 11 starts the table registration process (Start).

When the table registration process starts, the control unit 11 acquires each information, specifically information such as IP address and HOP number, of the node L being the sending source node device, from the received message (Step S51). Next, the control unit 11 recognizes the area to be registered in the table from the acquired IP address (Step S52). The node L is level 3, each level attention digit X=0 in FIG. 5(A) from the node ID.

Next, the control unit 11 judges whether or not the area of this level 3, each level attention digit X=0 is blank (Step S53). Here, since nothing is registered in the area and the area is blank as shown in FIG. 5(A), the control unit 11 judges that the area is blank (Step S53; YES), registers information of the message sending source node L (Step S56), and returns to a flow of the original process (Return).

(5) Process of Deleting Other Node Device From Table in Node Device

Figure 15:
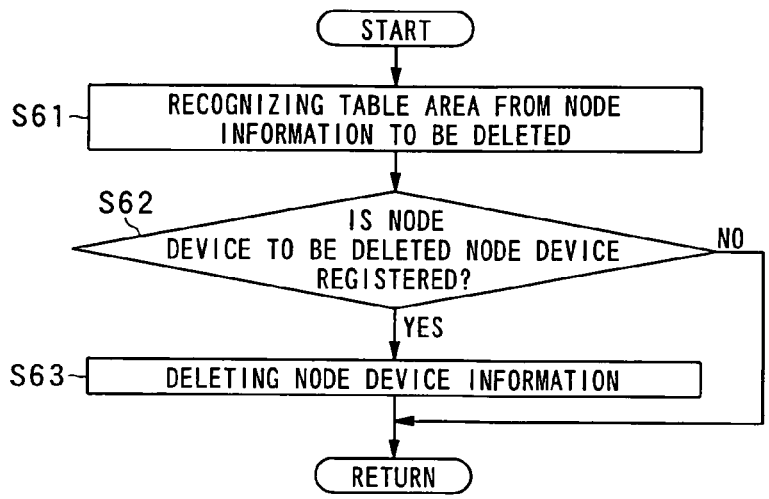
FIG. 15 is a flowchart showing a process of deleting from the table of another node device 1 in the node device 1.

A process of deleting the other node device from the table in the node device 1 is explained with reference to FIG. 15. Here, this process is in a case where the node device 1 deletes the node information in the above-mentioned Steps S41, S42, S46, and S55. In the below explanation, the node Z deletes information of the node A registered in the table.

When a process of deleting the node A from the table starts (Step S55), the control unit 11 of the node Z starts this process (Start).

When the deletion process from the table starts, the control unit 11 calculates the node ID [0211] from the IP address (112.*.*.*) of the node A to be deleted and recognizes the table area of [level number 1] [column number 1] (Step S61). Next, the control unit 11 judges whether or not the node device (node A) to be deleted is the node device registered in the table (Step S62). Here, since the node device (node A) to be deleted is the node device registered in the table, the control unit 11 judges so (Step S62; YES), deletes information such as IP address, port number, HOP number, or the like of the node A (Step S63), and returns to a flow of the original process (Return). Here, in Step S62, in a case where the control device 11 judges that the node device 1 to be deleted is not the node device registered in the table (Step S62; NO), the control unit 11** returns to a flow of the original process without carrying out the deletion process (Return).

[4. Modified Mode]

In each of the above-mentioned embodiments, the node device 1 memorizes DHT routing table and whether or not information of the other node device registered is changed is determined. However, it is not limited to this embodiment. The node device 1 may memorize the node information indicative of specific node device 1 having one or more memorizing means and the unique identification information corresponding to the node information, in correspondence with respect to every area which the identification information belong to.

In each of the above-mentioned embodiments, although in explanation, the TTL value and the HOP number (a distance in terms of network) are used as information of communication load in the present invention, information of communication load is not limited to this. As information of the communication load, RTT (packet reciprocal delay time), communication transmission speed, effective bandwidth, operation rate of communication network, communication operation rate of the node device, or the like may be used. In the present invention, a parameter of degree of influence which the communication between the own node device and the other node device give on the communication load of the entire communication network may be used as information of the communication load so as to decrease the communication load of the entire communication network in the communication system.

In the above-mentioned embodiment, it is determined whether or not information registered in the table is changed when the message is received as information. However, receiving information is not limited to receiving of message. For example, the packet is received from the other node device as the node Z in FIG. 7 receives the ACK/SYN packet. In a case where existence of the node device of the partner is confirmed, comparison means and memory information change means can function as the information is received.

In the above-mentioned embodiment, RAW socket is used so that information of the communication load is sent together when information is sent, and information of the communication load to the sending source node device can be acquired when information is received. However, a method of acquiring information of the communication load is not limited to this, and information of the communication load may be inquired to the other node device to acquire information of the communication load. Further, although the memory unit 12 memorizes information of the communication load together with the DHT routing table in the present embodiment, the configuration is not limited to this. In a case where need is risen in a comparison means, information of the communication load may be acquired from the other node device every time.

Figure 13:
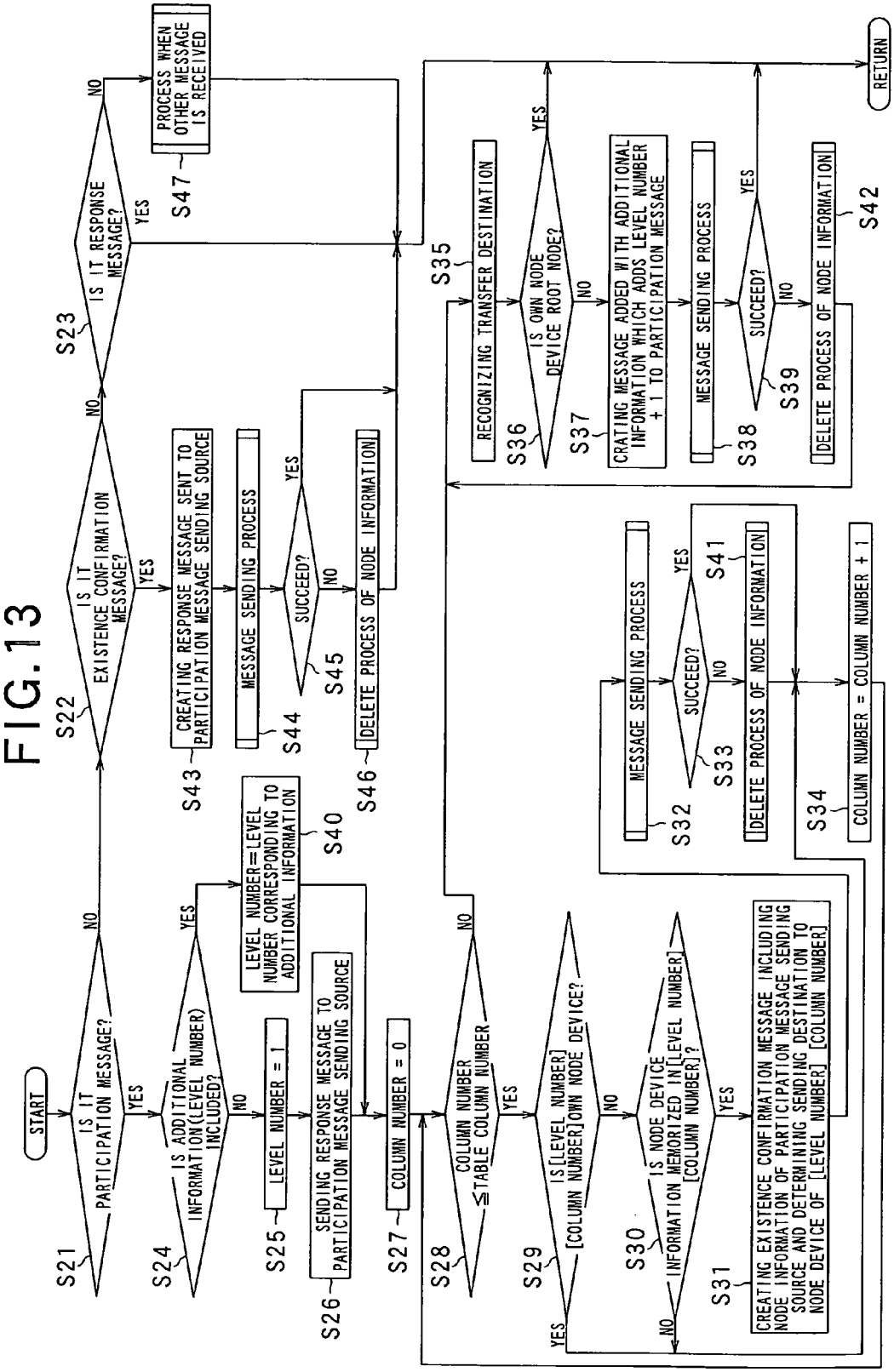
FIG. 13 is a flowchart showing a process of sending a message in the node device 1.

There is described Step S26 of FIG. 13 while omitting the case where the participation message sending process is failed. However, in a case where sending process ends in failure as shown in FIG. 12, a participation message may be sent again to the other node device memorized or information of the contact node such as a server device may be inquired to the server device or the like.

Although, in the above-mentioned embodiment, TTL value information is acquired by using the RAW socket as an interface in the initial stage of establishing communication, a method of acquiring information of communication load with each other between node devices is not limited to this mode. Information of communication load may be acquired by other methods.

When the node device 1 of the present embodiment, which participates in the information communication system S, actions of each node device and the entire system are not limited to the mode explained with reference to FIGS. 16 and 17. The participating node device 1 may acquire node information or the like of the other node devices by other various methods and create tables.

Further, a program corresponding to each action of the above-mentioned node device 1 is memorized in the information recording medium such as flexible disk or hard disk, or acquired through a network such as internet and recorded and the program is read out to execute, thereby causing the micro computer function as the control unit 11 related to each embodiment.

The present invention is not confined to the configuration listed in the foregoing embodiments, but it is easily understood that the person skilled in the art can modify such configurations into various other modes, within the scope of the present invention described in the claims.

What is claimed is:

1. An information communication system formed by participation of a plurality of node devices mutually connected through a communication network, wherein the plurality of node devices includes a first node device with a memory device and a computer processor, the first node device comprising:
   a memory unit that memorizes a routing table, wherein the routing table registers node information indicative of a second node device which is connected to an overlay network configured by the plurality of the node devices, and a first communication load information indicative of a communication load from the second node device indicated by the node information, to the first node device in correspondence with each other,
   an information receiving unit that receives information from a third node device which is at least any one of the plurality of node devices and is connected to the overlay network, and a second communication load information indicative of a communication load from the third node device to the first node device;
   a comparison unit configured to compare the second communication load information with the first communication load information; and
   a control unit configured to control to register node information of the third node device and the second communication load information in the routing table in place of the node information of the second node device and the first communication load information registered in the routing table, in response to determine that the communication load indicated by the second communication load information is smaller than the communication load indicated by the first communication load information by the comparison unit,
   wherein the memory device stores the memory unit, the information receiving unit, the comparison unit and the control unit, and the computer processor executes the stored units in the memory device.

2. A communication method in an information communication system formed by participation of a plurality of node devices mutually connected through a communication network, wherein the plurality of node devices includes a first node device including a memorizing unit that memorizes a routing table, wherein the routing table registers node information indicative of a second node device which is connected to an overlay network configured by the plurality of the node devices, and a first communication load information indicative of a communication load from the second node device indicated by the node information, to the first node device in correspondence with each other, the communication method comprising:
   receiving information from a third node device which is at least any one of the plurality of node devices and is connected to the overlay network, and a second communication load information indicative of a communication load from the third node device to the first node device;
   comparing the second communication load information with the first communication load information; and
   controlling to register node information of the third node device and the second communication load information in the routing table in place of the node information of the second node device and the first communication load information registered in the routing table, in response to determine that the communication load indicated by the second communication load information is smaller than the communication load indicated by the first communication load information in the comparing step.

3. A first node device included in an information communication system formed by participation of a plurality of node devices mutually connected through a communication network, the first node device with a memory device and a computer processor, the first node device comprising:
   a memory unit that memorizes a routing table, wherein the routing table registers node information indicative of a second node device which is connected to an overlay network configured by the plurality of the node devices, and a first communication load information indicative of a communication load from the second node device indicated by the node information, to the first node device in correspondence with each other;
   an information receiving unit that receives information from a third node device which is at least any one of the plurality of node devices and is connected to the overlay network, and a second communication load information indicative of a communication load from the third node device to the first node device;
   a comparison unit configured to compare the second communication load information with the first communication load information; and
   a control unit configured to control to register node information of the third node device and the second communication load information in the routing table in place of the node information of the second node device and the first communication load information memorized in the routing table, in response to determine that the communication load indicated by the second communication load information is smaller than the communication load indicated by the first communication load information by the comparison unit,
   wherein the memory device stores the memory unit, the information receiving unit, the comparison unit and the control unit, and the computer processor executes the stored units in the memory device.

4. The first node device according to claim 3,
wherein a value based on a number of network connection devices, which are routed through when the second node device or the third node device communicates with the first node device, is used as the first communication load or the second communication load.

5. An information processing program embodied in a non-transitory computer-readable medium and representing a sequence of instructions that operates the node devices as defined by claim 4.

6. The first node device according to claim 3,
wherein the information receiving unit receives the first communication load information from the second node device.

7. An information processing program embodied in a non-transitory computer-readable medium and representing a sequence of instructions that operates the node devices as defined by claim 6.

8. The first node device according to claim 3, further comprising:
an acquiring unit configured to acquire the first communication load information or the second communication load information at an initial stage of establishing communication with the second node device or the third node device; and
a communication load information sending unit that sends the first communication load information or the second communication load information, in response to sending the first communication load information or the second communication load information to the second node device or the third node device.

9. The first device according to claim 8,
wherein the communication load information sending unit sends signals for establishing communication at the initial stage of establishing communication with the second node device or the third node device, and
the information receiving unit receives signals including signals corresponding to the first communication load information or the second communication load information in response to the received signal and acquires the first communication load information or the second communication load information by reading the signals.

10. The first node device according to claim 8,
wherein the communication load information sending unit uses a RAW socket in response to acquiring the first communication load information or the second communication load information, and uses an ordinary socket in response to sending the information and the first communication load information or the second communication load information.

11. An information processing program embodied in a non-transitory computer-readable medium and representing a sequence of instructions that operates the node devices as defined by claim 8.

12. An information processing program embodied in a non-transitory computer-readable medium and representing a sequence of instructions that operates the node devices as defined by claim 9.

13. An information processing program embodied in a non-transitory computer-readable medium and representing a sequence of instructions that operates the node devices as defined by claim 10.

14. An information processing program embodied in a non-transitory computer-readable medium and representing a sequence of instructions that operates the node devices as defined by claim 3.

15. The first node device according to claim 3, further comprising:
an area determination unit configured to determine an area in the routing table, to which the node information of the third node device, received by the information receiving unit, belongs,
wherein the control unit determines whether or not the area to which the node information belongs is empty,
if the area is empty, the memory unit memorizes the node information of the third node device and the second communication load information to the area in correspondence to each other, and
if the area is not empty, the comparison unit compares the second communication load information with the first communication load information.

16. The first node device according to claim 3, further comprising:
an area determination unit configured to determine an area in the routing table, to which the node information of the second node device to be deleted, belongs,
wherein, if the area determined by the area determination unit includes the node information of the second node device to be deleted, the area determination unit deletes the node information of the second node device and the first communication load information.

17. The first node device according to claim 3,
wherein the routing table registers an IP address and a node ID as the node information and a HOP number as the communication load information in correspondence with each other.

18. A non-transitory computer-readable recording medium storing a program for operating a first node device included in an information communication system formed by participation of a plurality of node devices mutually connected through a communication network, wherein the first node device included in the plurality of node devices comprises a memory unit that memorizes a routing table, wherein the routing table registers node information indicative of a second node device which is connected to an overlay network configured by the plurality of the node devices, and a first communication load information indicative of a communication load from the second node device indicated by the node information, to the first node device in correspondence with each other, the program causing a computer of the first node device to execute the following steps:
receiving information from a third node device which is at least one of the plurality of node devices and is connected to the overlay network, and a second communication load information indicative of a communication load from the third node device to the first node device;
comparing the second communication load information with the first communication load information; and
registering the node information of the third node device and the second communication load information in the routing table in place of the node information of the second node device and the first communication load information registered in the routing table, in response to determining that the communication load indicated by the second communication load information is smaller than the communication load indicated by the first communication load information.

19. The non-transitory computer-readable recording medium according to claim 18,
wherein a value based on a number of network connection devices, which are routed through when the second node device or the third node device communicates with the first node device, is used as the first communication load or the second communication load.

20. The non-transitory computer-readable recording medium according to claim 18,
wherein the routing table registers an IP address and a node ID as the node information and a HOP number as the communication load information in correspondence with each other.

* * * * *